(12) United States Patent
Gupta et al.

(10) Patent No.: US 9,226,289 B2
(45) Date of Patent: Dec. 29, 2015

(54) SYSTEMS AND METHODS TO CONSERVE POWER OF MACHINE-TO-MACHINE DEVICES USING A SHARED DATA CHANNEL

(71) Applicant: QUALCOMM Incorporated, San Diego, CA (US)

(72) Inventors: Alok K. Gupta, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 13/718,437

(22) Filed: Dec. 18, 2012

(65) Prior Publication Data

US 2014/0169340 A1    Jun. 19, 2014

(51) Int. Cl.
| | |
|---|---|
| H04J 3/00 | (2006.01) |
| H04W 72/04 | (2009.01) |
| H04W 4/00 | (2009.01) |
| H04L 1/00 | (2006.01) |
| H04W 84/18 | (2009.01) |
| H04W 52/02 | (2009.01) |

(52) U.S. Cl.
CPC ......... *H04W 72/0446* (2013.01); *H04L 1/0002* (2013.01); *H04W 4/005* (2013.01); *H04W 52/0216* (2013.01); *H04W 84/18* (2013.01)

(58) Field of Classification Search
CPC ..... H04W 16/14; H04W 36/00; H04W 72/02; H04W 76/048; H04W 88/06; H04W 4/005; H04W 68/00; H04W 72/0446; H04W 74/006; H04W 84/18; H04L 1/0002
See application file for complete search history.

(56) References Cited

U.S. PATENT DOCUMENTS

| | | | |
|---|---|---|---|
| 2008/0089361 A1* | 4/2008 | Metcalf et al. | 370/474 |
| 2009/0022136 A1* | 1/2009 | Joshi et al. | 370/348 |
| 2011/0134841 A1 | 6/2011 | Shaheen | |
| 2011/0201365 A1 | 8/2011 | Segura | |
| 2012/0030358 A1 | 2/2012 | Mackenzie | |
| 2012/0195216 A1 | 8/2012 | Wu et al. | |
| 2012/0231828 A1 | 9/2012 | Wang et al. | |

FOREIGN PATENT DOCUMENTS

| | | | | |
|---|---|---|---|---|
| WO | 2012074257 A2 | 6/2012 | | |
| WO | WO 2012074257 | * | 6/2012 | ............ H04W 68/02 |

OTHER PUBLICATIONS

International Search Report and Written Opinion—PCT/US2013/075981—ISA/EPO—Mar. 24, 2014.

(Continued)

*Primary Examiner* — David Oveissi
(74) *Attorney, Agent, or Firm* — Michael J. DeHaemer, Jr.

(57) ABSTRACT

Methods, systems, and devices are described for managing wireless communications in a machine-to-machine (M2M) wireless Wide Area Network (WAN). A traffic slot map is generated. The traffic slot map identifies one or more first time slots and one or more second time slots. First data is transmitted during the one or more first time slots at a first data rate. Second data is transmitted during the one or more second time slots at a second data rate. The traffic slot map is broadcasted to one or more M2M devices during a traffic slot of a first forward link frame at a beginning of a traffic channel cycle.

37 Claims, 18 Drawing Sheets

Slot Map 1020-b

| Number of slots at first data rate 1105 | Number of slots at second data rate 1110 | Number of terminals receiving at first data rate 1115 | Number of terminals receiving at second data rate 1120 | Hashing Parameters 1125 |
|---|---|---|---|---|
| | | | | |

(56) References Cited

OTHER PUBLICATIONS

Safdar G.A., et al., "Pointer controlled power saving medium access control protocol for IEEE 802.11 infrastructure networks", Personal, Indoor and Mobile Radio Communications, 2004. PIMRC 2004. 15 TH IEEE International Symposium on Barcelona, Spain Sep. 5-8, 2004, Piscataway, NJ, USA,IEEE, Piscataway, NJ, USA, vol. 2, Sep. 5, 2004, pp. 915-919, XP010754098, DOI: 10.1109/PIMRC.2004. 1373832 ISBN: 978-0-7803-8523-8 Section II : PCF-PS and PCSAR.

* cited by examiner

Slot Map 1020-b

| Number of slots at first data rate 1105 | Number of slots at second data rate 1110 | Number of terminals receiving at first data rate 1115 | Number of terminals receiving at second data rate 1120 | Hashing Parameters 1125 |
|---|---|---|---|---|

FIG. 11

SYSTEMS AND METHODS TO CONSERVE POWER OF MACHINE-TO-MACHINE DEVICES USING A SHARED DATA CHANNEL

BACKGROUND

The following relates generally to wireless communication, and more specifically to communications in a machine-to-machine (M2M) wireless wide area network (WAN). Wireless communications systems are widely deployed to provide various types of communication content such as voice, video, packet data, messaging, broadcast, sensor data, tracking data, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple devices. In some examples, these devices may be sensors and/or meters configured to collect data and transmit this data to an end server via a base station. These sensors and/or meters may be referred to as M2M devices. Base stations may communicate with M2M devices on forward and reverse links. Each base station has a coverage range, which may be referred to as the coverage area of the cell. An M2M device may transmit data to a base station on the reverse link.

The base station may transmit data to M2M devices according to a traffic cycle during a traffic slot of one or more forward link frames. Data intended for more than one M2M device may be transmitted in a same traffic slot. With traditional communication systems, when an M2M device is expecting data in a shared traffic channel, the device would wake up to read data transmitted in each traffic slot until it finds its data. This traditional approach is an inefficient use of power of the M2M device.

SUMMARY

The described features generally relate to one or more improved systems, methods, and/or apparatuses for minimizing the power usage of an M2M device communicating in an M2M wireless Wide Area Network (WAN). At the beginning of a cycle in which traffic data is transmitted to various M2M devices during different forward link frames, a traffic slot map is generated. The traffic slot map is broadcasted to each M2M device expecting to receive traffic data during the cycle. The map may be broadcasted during at least a portion of the traffic slot of the first forward link frame of the cycle. In one embodiment, the traffic slot map may identify the number of traffic slots during which data will be transmitted at a first data rate, second data rate, etc. during the cycle. Further, the map may indicate the number of M2M devices that expect to receive their data at each particular data rate. Using this map, each M2M device expecting to receive data during the cycle may estimate when (e.g., which traffic slot and frame) their data will be transmitted during the cycle. The devices may return (and remain) in a sleep state until the estimated time arrives when their data is expected to be transmitted from the base station. By minimizing the amount of time an M2M device is in an awake mode during the cycle, power and other resources of the M2M devices may be conserved.

Methods, systems, and devices are described for managing wireless communications in an M2M wireless WAN. A traffic slot map is generated. The traffic slot map identifies one or more first time slots and one or more second time slots. First data is transmitted during the one or more first time slots at a first data rate. Second data is transmitted during the one or more second time slots at a second data rate. The traffic slot map is broadcasted to one or more M2M devices during a traffic slot of a first forward link frame at a beginning of a traffic channel cycle.

In one configuration, broadcasting the traffic slot map may include inserting the traffic slot map into a traffic channel of a traffic slot of a first forward link frame. The first forward link frame may be at a beginning of a traffic cycle. The traffic slot map may be broadcasted during the traffic slot of the first forward link frame. In one example, the traffic slot map may be broadcasted at a physical layer. The traffic slot map may identify a second time slot. During the second time slot, second data may be transmitted from the base station to a second group of one or more M2M devices at a second data rate.

In one embodiment, broadcasting the traffic slot map may also include broadcasting the traffic slot map before any transmission of the first data and the second data occurs. The traffic slot of the first forward link frame may include the first or second time slot.

In one example, a second forward link frame may be transmitted subsequent to a transmission of the first forward link frame. The second forward link frame may include a traffic slot. The traffic slot may include the first or second time slot.

In one configuration, the traffic channel cycle may include a first time allocation for forward link communications. The traffic channel cycle may also include a second time allocation for reverse link communications.

Transmitting the first data may include transmitting a pointer during the first time slot of a first forward link frame. The pointer may identify an additional time slot of an additional forward link frame. At least a portion of the first data may be transmitted during the additional time slot. In one embodiment, the portion of the first data may be transmitted at the first data rate.

In one embodiment, the traffic slot map may identify a first number of M2M devices expecting to receive the first data at the first data rate and a second number of M2M devices expecting to receive the second data at the second data rate. The first and second data may be transmitted at a physical layer.

In one configuration, a first hashing function may be used to identify the first time slot for a first M2M device. A second hashing function may be used to identify a second time slot for a second M2M device. The first data rate may be different than the second data rate. The first and second time slots may be one or more traffic slots in one or more forward link frames.

A base station configured for wireless communication in an M2M wireless WAN is also described. The base station includes a processor and memory in electronic communication with the processor. Instructions may be stored in the memory. The instructions may be executable by the processor to generate a traffic slot map. The traffic slot map may identify one or more first time slots and one or more second time slots. During the one or more first time slots, first data may be transmitted from a base station to one or more M2M devices at a first data rate. During the one or more second time slots, second data may be transmitted from the base station to one or more M2M devices at a second data rate. The traffic slot map may be broadcasted to a plurality of M2M devices.

An apparatus configured for wireless communication in an M2M wireless WAN is also described. The apparatus may include means for generating a traffic slot map. The traffic slot map may identify one or more first time slots and one or more second time slots. During the one or more first time slots, first data may be transmitted from a base station to one or more M2M devices at a first data rate. During the one or more second time slots, second data may be transmitted from the base station to one or more M2M devices at a second data rate. The apparatus may further include means for broadcasting the traffic slot map to a plurality of M2M devices.

A computer program product for managing wireless communication in an M2M wireless WAN is also described. The computer program product may include a non-transitory computer-readable medium storing instructions executable by a processor to generate a traffic slot map. The traffic slot map may identify one or more first time slots and one or more second time slots. During the one or more first time slots, first data may be transmitted from a base station to one or more M2M devices at a first data rate. During the one or more second time slots, second data may be transmitted from the base station to one or more M2M devices at a second data rate. The instructions may also be executable by the processor to broadcast the traffic slot map to a plurality of M2M devices.

An additional method for wireless communication in an M2M wireless WAN is also described. A traffic slot map may be received during a first traffic slot in a first forward link frame at a beginning of a traffic channel cycle. The traffic slot map may be analyzed to identify a second traffic slot in a second forward link frame. The traffic data may be transmitted during the second traffic slot. A sleep state may be entered until the second traffic slot. An awake mode may be entered to receive the traffic data during the second traffic slot.

In one embodiment, analyzing the traffic slot map may include determining a number of M2M devices expecting to receive traffic data at a first data rate, and determining a number of M2M devices expecting to receive traffic data at a second data rate. The second data rate may be different from the first data rate. Further, analyzing the traffic slot map may include using a first hashing function to determine a number of traffic slots during which traffic data is transmitted at a first data rate, and using a second hashing function to determine a number of traffic slots during which traffic data is transmitted at a second data rate. In one configuration, receiving the traffic data may include using a device identifier to identify the traffic data transmitted during the second traffic slot.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 11 is a block diagram illustrating one example of a slot map in accordance with various embodiments;

DETAILED DESCRIPTION

Methods, systems, and devices are described to minimize the wake-up time of an M2M device during a traffic channel cycle. In one embodiment, data may be transmitted on a forward link from a base station to an M2M device during a traffic channel cycle at a physical layer. A portion of the cycle may be allocated for forward link communications and the remaining portion may be allocated for reverse link communications from the M2M device to the base station. Data may be transmitted on the forward link during a traffic slot of a forward link frame. During a traffic channel cycle, data may be transmitted during multiple traffic slots of multiple forward link frames. Traditionally, a device may remain in an awake mode for the duration of a cycle to receive its data. As a result, the device may be awake during numerous traffic slots of frames that do not include the data intended for the device. This may cause the device to waste power and other resources.

The present systems, methods, and devices may conserver the resources and power of M2M devices by minimizing the amount of time the devices are in an awake mode during a traffic channel cycle. In one example, a base station may broadcast a traffic slot map during at least a portion of a traffic slot of a forward link frame at the beginning of a traffic channel cycle. Each M2M device expecting to receive data during the cycle may wake up to monitor the traffic slot of the first forward link frame. Upon receiving the broadcasted traffic slot map, each M2M device may use the map to estimate when their data will be transmitted during the cycle. After estimating when its data will be transmitted during the cycle, an M2M device may return to a sleep state until the estimated time arrives when its data is expected to be transmitted. By allowing the M2M device to remain in the sleep state during traffic slots that do not include data for the device, the power of the M2M device may be conserved. In one embodiment, the traffic slot map may change for each new traffic channel cycle. In addition, the identity of the M2M devices that receive their data during a particular traffic slot may change during the next cycle. As a result, ad hoc groups of M2M devices may be formed for each traffic channel cycle.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
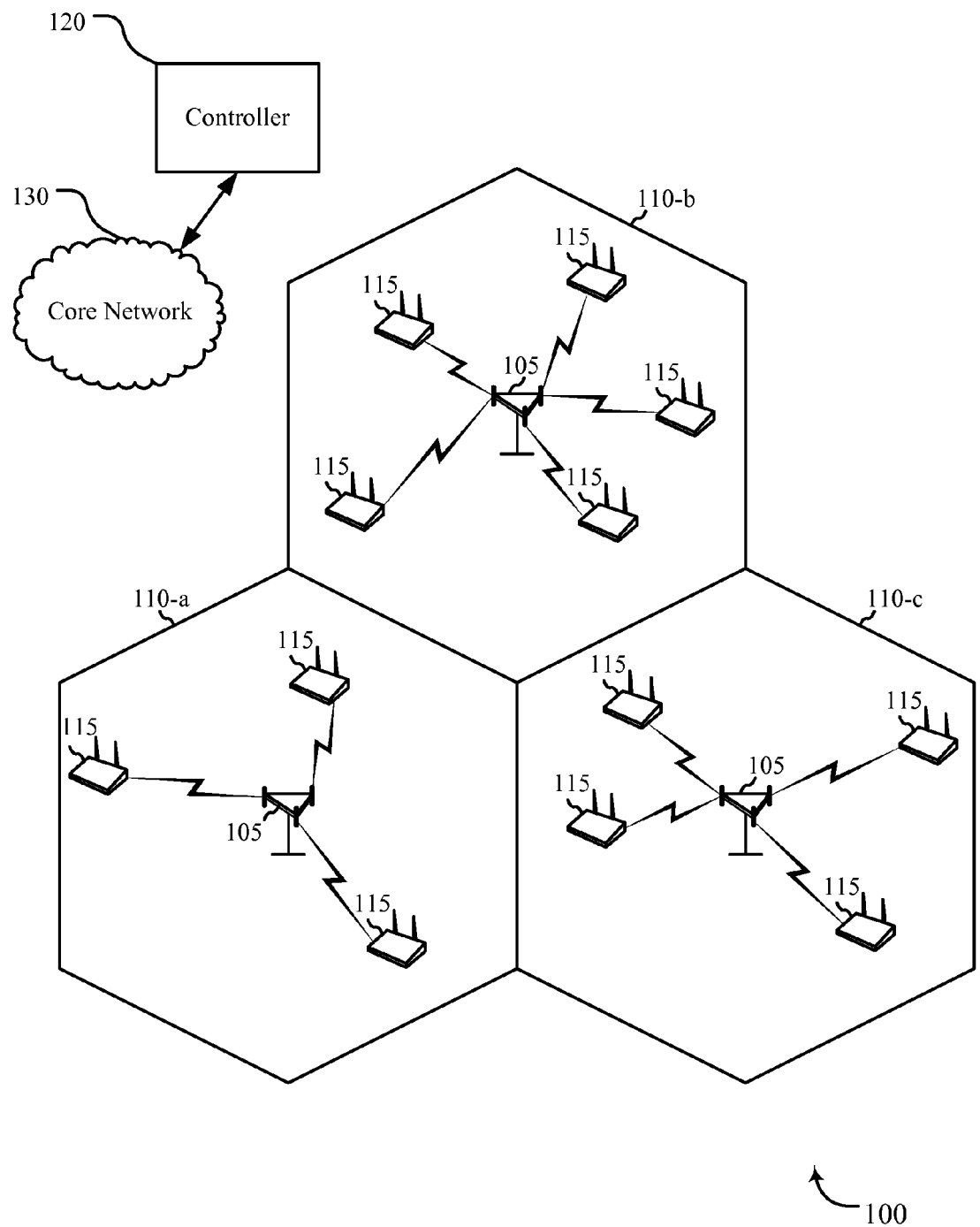
FIG. 1 shows a block diagram of a wireless communications system.

Referring first to FIG. 1, a block diagram illustrates an example of a wireless communications system 100. The system 100 includes base stations 105 (or cells), machine-to-machine (M2M) devices 115, a base station controller 120, and a core network 130 (the controller 120 may be integrated into the core network 130). The system 100 may support operation on multiple carriers (waveform signals of different frequencies).

The base stations 105 may wirelessly communicate with the M2M devices 115 via a base station antenna (not shown). The base stations 105 may communicate with the M2M devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 10 km in radius), and a femto base station may provide communication coverage for a relatively smaller geographic area (e.g., 1 km in radium). There may be overlapping coverage areas for different technologies.

The M2M devices 115 may be dispersed throughout the coverage areas 110. Each M2M device 115 may be stationary or mobile. In one configuration, the M2M devices 115 may be able to communicate with different types of base stations such as, but not limited to, macro base stations, pico base stations, and femto base stations. The M2M devices 115 may be sensors and/or meters that monitor and/or track other devices, environmental conditions, etc. The information collected by the M2M devices 115 may be transmitted across a network that includes a base station 105 to a back-end system, such as a server. The transmission of data to/from the M2M devices 115 may be routed through the base stations 105. The base stations 105 may communicate with the M2M devices on a forward link. In one configuration, the base stations 105 may generate a forward link frame with a number of time slots that include channels to carry data and/or messages to an M2M device 115. In one example, each forward link frame may include no more than three time slots and one or more corresponding channels. These slots and channels may include a paging slot with a paging channel, an ACK slot with an ACK channel, and a traffic slot with a traffic channel. The length of an individual frame may be short (e.g., 20 milliseconds (ms)). In one embodiment, four frames may be joined to form a larger frame with a duration of 80 ms. Each frame included in the larger frame may include no more than three time slots and channels such as the paging slot for the paging channel, the ACK slot for the ACK channel, and the traffic slot for the traffic channel. The paging and ACK slots of each frame may each have a length of 5 ms while the traffic slot of each frame may have a length of 10 ms. An M2M device 115 may wake up during the individual frames (within the larger frame) that include data and/or messages on its channels that are intended for that M2M device 115.

In one configuration, a base station 105 may transmit data to an M2M device 115 according to a traffic channel cycle. The traffic channel cycle may be a time period during which traffic data is transmitted to one or more M2M devices 115 during one or more traffic slots of forward link frames. Each M2M device 115 may be aware of when its traffic channel cycle begins. At the beginning of the cycle, the M2M device 115 may wake-up during the traffic slot of the first forward link frame of the cycle. The traffic slot may include a slot map. The map may indicate when the data will be transmitted to the M2M device 115 during the cycle. The information included in the map may be hashed for each M2M device 115 that wakes up to receive the slot map. After receiving the map during the traffic slot of the first frame, the device 115 may return to a sleep state until the data is transmitted during the traffic slot indicated in the slot map. As a result, each M2M device 115 may wake up to receive the slot map, and then return to the sleep state until its traffic data is transmitted during a traffic slot identified by the slot map.

In one embodiment, M2M devices 115 may be incorporated in other devices or the M2M devices 115 may be standalone devices. For example, devices such as cellular phones and wireless communications devices, personal digital assistants (PDAs), other handheld devices, netbooks, notebook computers, surveillance cameras, handled medical scanning devices, home appliances, etc. may include one or more M2M devices 115.

In one example, the network controller 120 may be coupled to a set of base stations and provide coordination and control for these base stations 105. The controller 120 may communicate with the base stations 105 via a backhaul (e.g., core network 125). The base stations 105 may also communicate with one another directly or indirectly and/or via wireless or wireline backhaul.

Figure 2:
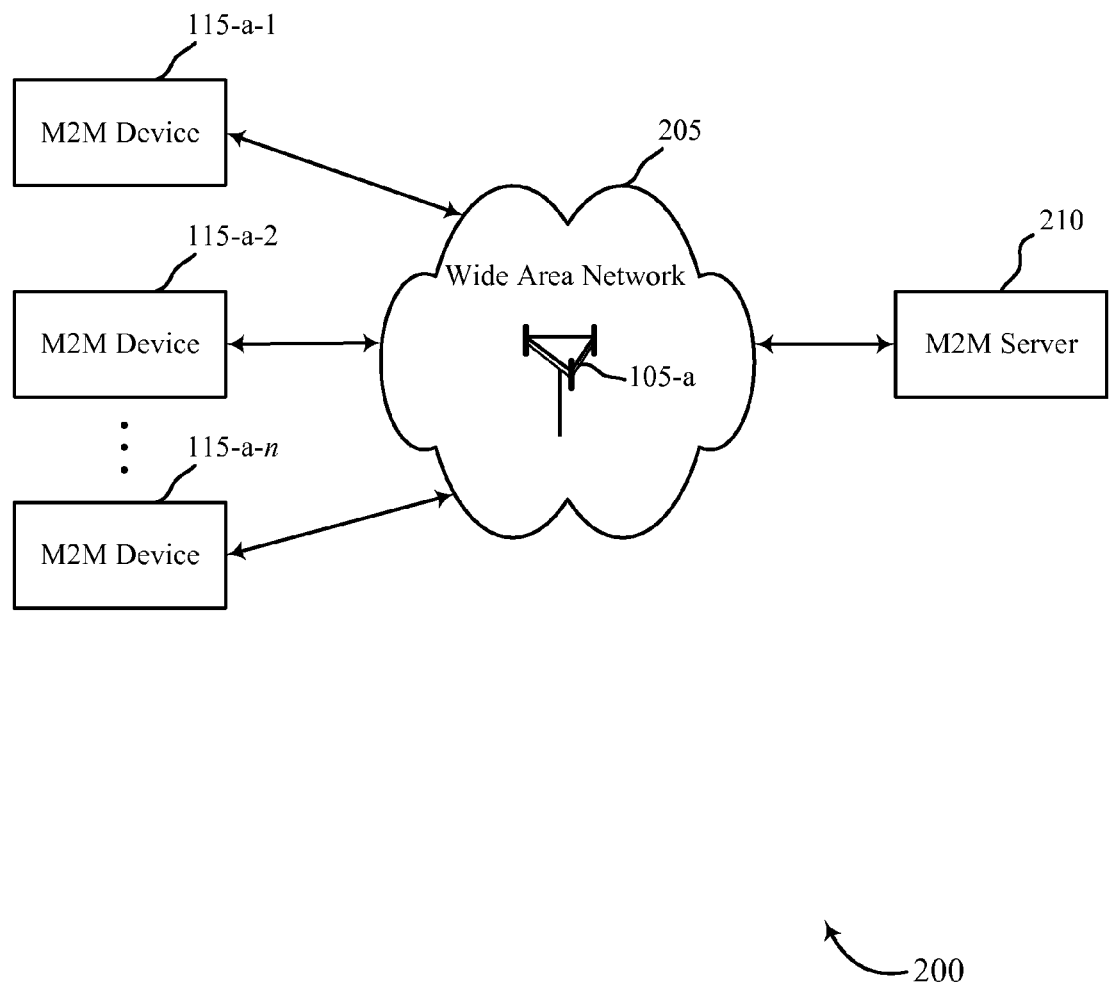
FIG. 2 illustrates an example of a wireless communication system including a wireless wide area network (WAN) implementing M2M communications.

FIG. 2 illustrates an example of a wireless communication system 200 including a wireless wide area network (WAN) 205 implementing an M2M service according to one aspect. The system 200 may include a number of M2M devices 115-$a$ and an M2M server 210. Communications between the server 210 and M2M devices 115 may be routed through a base station 105, which may be considered part of the WAN 205. The base station 105-$a$ may be an example of the base stations illustrated in FIG. 1. The M2M devices 115-$a$ may be examples of the M2M devices 115 illustrated in FIG. 1. One skilled in the art would understand that the quantity of M2M devices 115-$a$, WANs 205, and M2M servers 210 shown in FIG. 2 is for illustration purposes only and should not be construed as limiting.

The wireless communication system 200 may be operable to facilitate M2M communications. M2M communications may include communications between one or more devices without human intervention. In one example, M2M communications may include the automated exchange of data between a remote machine, such as an M2M device 115-$a$, and a back-end IT infrastructure, such as the M2M server 210, without user intervention. The transfer of data from an M2M device 115-$a$ to the M2M server 210 via the WAN 205 (e.g., the base station 105-$a$) may be performed using reverse link communications. Data collected by the M2M devices 115-$a$ (e.g., monitoring data, sensor data, meter data, etc.) may be transferred to the M2M server 210 on the reverse link communications.

The transfer of data from the M2M server 210 to an M2M device 115-$a$ via the base station 105-$a$ may be performed via forward link communications. The forward link may be used to send instructions, software updates, traffic data, and/or messages to the M2M devices 115-$a$. The instructions may instruct the M2M devices 115-$a$ to remotely monitor equipment, environmental conditions, etc. M2M communications may be used with various applications such as, but not limited to, remote monitoring, measurement and condition recording, fleet management and asset tracking, in-field data collection, distribution, and storage, etc. The base station 105-$a$ may generate one or more forward link frames with a small number of time slots with channels to transmit instructions, software updates, and/or messages. The various M2M devices 115-$a$ may wake up during the time slots of a specific frame when instructions or other data is included on a channel during the time slots of that frame. The devices 115-$a$ may become aware that instructions or other data are available by decoding a paging message during a paging slot of a frame. A paging cycle may indicate how often the base station 105-$a$ should transmit a paging message to an M2M device 115-$a$. The device 115-$a$ may wake up during a paging slot to monitor for a paging message according to the paging cycle. The paging messages may be transmitted at different data rates, depending on the signal strength of the M2M device 115-$a$.

In one configuration, different types of M2M communications may be proposed in different wireless access networks that use different addressing formats. Different addressing formats may lead to different types of M2M devices 115-$a$ being used for different services. In one aspect, an M2M network may be implemented which may maintain the M2M devices 115-$a$ independent of the WAN technology that is used to communicate with the M2M server 210. In such an aspect, the M2M devices 115-$a$ and the M2M server 210 may be made independent of the WAN technology that is used. As a result, a WAN technology used for backhaul communication may be replaced with a different WAN technology, without affecting the M2M devices 115-$a$ that may already be installed. For example, the M2M server 210 and an M2M device 115-$a$ may communicate with each other irrespective of the addressing format used by the WAN technology since the addressing format used by the M2M device 115-$a$ may not be tied with the addressing used by the implemented WAN technology.

In one embodiment, the behavior of the M2M devices 115-$a$ may be pre-defined. For example, the day, time, etc. to monitor another device and transmit the collected information may be pre-defined for an M2M device 115-$a$. For example, the M2M device 115-$a$-1 may be programmed to begin monitoring another device and collect information about that other device at a first pre-defined time period. The device 115-$a$-1 may also be programmed to transmit the collected information at a second pre-defined time period. The behavior of an M2M device 115-$a$ may be remotely programmed to the device 115-$a$.

Figure 3A:
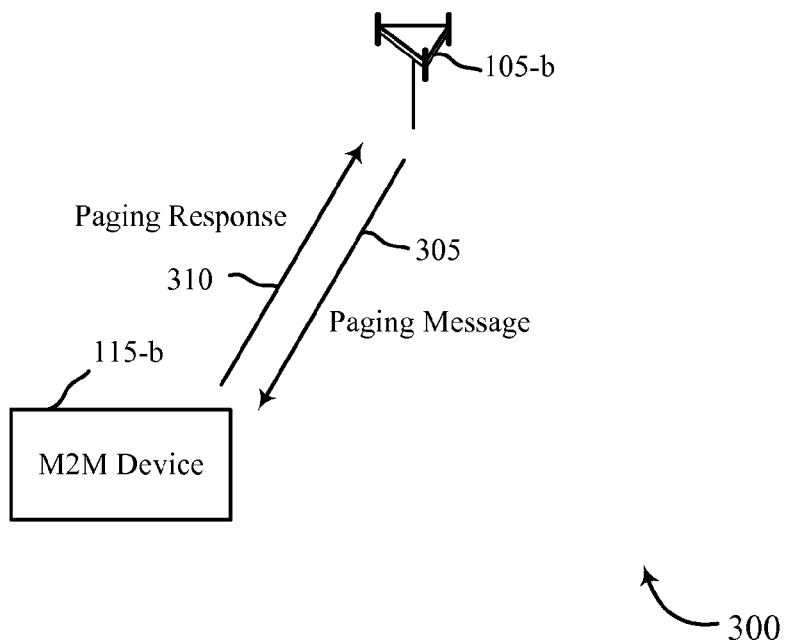
FIG. 3A shows a block diagram illustrating one embodiment of a paging system.

FIG. 3A is a block diagram illustrating one embodiment of a paging system 300 including a base station 105-$b$ and an M2M device 115-$b$. The base station 105-$b$ may be an example of the base stations 105 of FIG. 1 or 2. The M2M device 115-$b$ may be an example of the M2M devices 115 of FIG. 1 or 2.

In a wireless communication system, such as the systems of FIG. 1 or 2, the notions of sleep state and paging are important to provide network connectivity to a large population of devices (e.g., M2M devices 115) in a battery power and air link resource efficient manner. A sleep state may provide the M2M device 115-$b$ with a mode of operation to minimize battery power consumption by shutting down the whole or a part of the devices' transmit/receive circuitry. In addition, an M2M device 115 in the sleep state may not be allocated any dedicated air link resource and therefore a large number of M2M devices may be simultaneously supported. During time intervals where the M2M device 115-$b$ has no traffic activity, the device 115-$b$ may remain in the sleep state to conserve resources.

Paging may involve the M2M device 115-$b$ waking up periodically from the sleep state, and having the M2M device 115-$b$ operate to receive and process a paging message 305 in the forward link communications (e.g., communications from the base station 105-$b$ to the M2M device 115-$b$). The base station 105-$b$ may be aware when the M2M device 115-$b$ should wake up. Thus, if the base station 105-$b$ intends to contact, or page, the M2M device 115-$b$, the base station 105-$b$ may send the paging message 305 in a paging channel during all or a portion of one or more paging slots of a forward link frame at the time when the M2M device 115-$b$ is scheduled to wake up and monitor the paging channel. The base station 105-$b$, however, may not be aware of the signal strength of each M2M device 115 in the M2M wireless WAN. As a result, the base station 105-$b$ may transmit paging messages at a high data rate using a first paging channel. If the M2M device 115-$b$ is unable to properly demodulate the paging message 305 because the signal strength between the base station 105-$b$ and the device 115-$b$ is too low, the base station 105-$b$ may dynamically change the data rate used to transmit the message to the device 115-$b$. In addition, the base station 105 may increase the frequency it transmits the paging message 305 and the device 115-$b$ may increase the frequency it wakes up to monitor for the paging message 305 sent at the lower data rate. In one configuration, if the base station 105-$b$ does not receive a paging response 310 confirming that the M2M device 115-$b$ has received the paging message, the base station 105-$b$ may retransmit the paging message 305 using a second paging channel during the paging slot more frequently and at a lower data rate. The base station 105-$b$ may retransmit the paging message 305 until either the M2M device 115-*b* receives the paging message 305 and transmits a paging response 310 and/or a certain number of transmissions of the paging message 305 have occurred. If one or both of these events occur, the base station 105-*b* and the M2M device 115-*b* may return to operate under the previous paging cycle and the base station 105-*b* may return to transmit paging messages to the device 115-*b* at a high data rate using the first paging channel.

The time interval between two successive wake-up periods of an M2M device 115-*b* may be referred to as a paging cycle. The M2M device 115-*b* may operate in a sleep state during the portion of the paging cycle when the M2M device 115-*b* is not performing processing related to receiving a paging message 305. In order to maximize the benefit of the sleep state, the paging system 300 may use a large value for the paging cycle. For example, in a data system, the paging cycle may be about 5 minutes. As mentioned above, if the base station 105-*b* does not receive the paging response 310 indicating the successful receipt of the paging message 305, the base station 105-*b* may retransmit the paging message 305 using a smaller paging cycle until the paging response 310 is received. The retransmission of the paging message 305 may occur using the same channel or a different channel. Further, the M2M device 115-*b* may wake up more periodically (i.e., shorter paging cycle) to monitor paging slots of frames for the paging message 305.

In one embodiment, the paging channel used during the paging slot of a frame may have sufficient bandwidth to carry a number of paging messages 305. In one example, the paging channel may carry less than the maximum amount of paging messages 305. The base station 105-*b* may insert system information into the extra, unused bandwidth of the paging channel during the paging slot. The system information may be used by a number of M2M devices 115 to acquire the timing of the signals transmitted from the base station 105-*b*. Reusing the paging channel to transmit system information avoids the need to set up additional channels during additional time slots of the forward link frames to carry such information (which may increase the overall length of a forward link frame). As a result, M2M devices 115 may conserve power by minimizing the amount of time they are in an awake mode. By reusing the paging channel, the time slots of the frames transmitted on the forward link may be kept short, allowing the M2M devices 115 to return to the sleep mode as quickly as possible.

Upon receiving the paging message 305, the M2M device 115-*b* may carry out any operations specified in the paging message 305. For example, the M2M device 115-*b* may just receive the paging message 305 and go back to the sleep state. Alternatively, the M2M device 115-*b* may access the base station 105-*b* to establish an active connection with the base station 105-*b*.

Figure 3B:
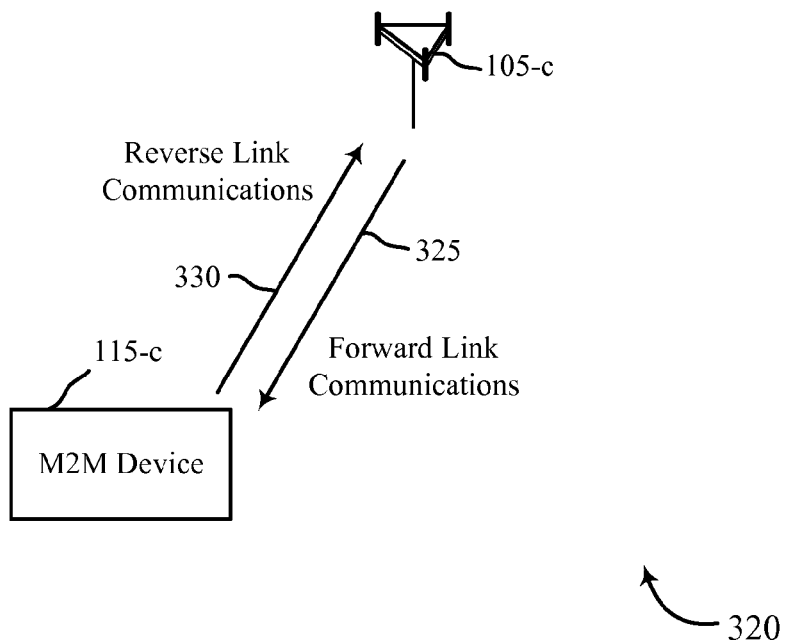
FIG. 3B is a block diagram illustrating one embodiment of a wireless communications system.

FIG. 3B is a block diagram illustrating one embodiment of a wireless communications system 320. The system 320 may include a base station 105-*c* and an M2M device 115-*c*. The base station 105-*c* and the M2M device 115-*c* may be examples of the base stations and M2M devices of FIG. 1, 2, or 3A. In one configuration, the base station 105-*c* may communicate with the M2M device 115-*c* using a forward link frame with a limited number of time slots for logical channels used for forward link communications 325. The M2M device 115-*c* may communicate with the base station 105-*c* using reverse link communications 330. Communications that occur using the forward and reverse link communications may be M2M communications, as described above. These communications may take various forms, depending principally on the air interface protocol used by the base station 105-*c* and the M2M device 115-*c*.

The base station 105-*c* may be arranged to communicate on one or more carrier frequencies, typically using a pair of frequency bands to define the forward and reverse links communications, respectively. The base station 105-*c* may also include a set of directional antenna elements arranged to define multiple cell sectors. M2M communications in each sector on a given carrier frequency may be distinguished from communications in other sectors by modulating the communications in the given sector with a sector-specific code, such as a pseudo-random noise offset ("PN offset"). Further, M2M communications in each sector may be divided into control and traffic channels, each of which may be defined through time division multiplexing (TDM).

In one embodiment, signals may be transmitted on the forward link communications 325 and the reverse link communications 330 in a frame format. Within the frame format, information may be packetized and formatted according to the actual payload data to be communicated over the communication links 325, 330. In one configuration, the format of a frame transmitted on the forward link communications 325 may include various time slots for various channels. In one embodiment, the frame may include a paging slot for the paging channel, an ACK slot for the ACK channel, and a traffic slot for the traffic channel. As mentioned above, paging messages 305 and/or system information may be transmitted in the paging channel (according to the paging cycle) to the M2M device 115-*c* during a paging slot. ACK message may be transmitted in the ACK channel to an M2M device during the ACK time slot when a signal or data is successfully received at the base station 105-*c*. Traffic data may be transmitted in the traffic channel to the M2M device 115-*c* during the traffic time slot. Frames used on the forward link communications 325 in M2M communications may be based on a short duty cycle.

To conserver power, an M2M device 115 may wake up only during specific time slots of specific forward link frames to receive data, paging messages 305, etc. As a result, the frame structure in M2M communications may be slotted for each M2M device. Thus, each device 115 may only be required to wake up during one or more slots of one or more frames that are needed to retrieve its data. At the commencement of a traffic channel cycle, a slot map may be broadcasted to each M2M device 115 that is expecting to receive traffic data during the cycle. The slot map may include information that allows each M2M device to estimate when their respective traffic data will be transmitted on the forward link during the cycle. The information within the slot map may be hashed to enable each device 115 to identify when its data will be transmitted. After receiving the slot map, the devices 115 may return to a sleep state and awake again during the one or more traffic slots in which their data is transmitted.

In one configuration, to preserve communication resources, the M2M device 115-*c* may perform opportunistic decoding of a message transmitted from the base station 105-*c* in order to return to the sleep state, according to the present systems and methods. In one embodiment, the base station 105-*c* may generate one or more forward link frames and transmit multiple copies of a message to the M2M device 115-*c* using a channel of the one or more forward link frames. Each copy of the message may be sent in a sub-channel at a high data rate. The M2M device 115-*c* may read as many copies of the message as are needed to successfully demodulate the message. In one configuration, the M2M device 115-*c* may estimate the number of copies of the message it needs to receive to decode the message based on the received signal strength from a pilot signal transmitted from the base station 105-c. Upon successfully decoding the message, the device 115-c may return to a sleep state before generating and transmitting an physical layer ACK message back to the base station 105-c. If additional copies of the message remain in the sub-channels, the base station 105-c may continue to transmit the additional copies (even though the M2M device 115-c has returned to the sleep state). In one configuration, the device 115-c may conserve battery power by not transmitting the physical layer ACK message to the base station indicating that the message has been demodulated.

In one embodiment, the reverse link communications 330 may be terminated early to conserve the battery power of the M2M device 115-c and air interface resources between the M2M device 115-c and the base station 105-c. As stated above, a forward link frame may include an ACK slot during which an ACK message may be transmitted. The channel used to transmit the ACK message during the slot may be a random access channel. The base station 105-c may use channel to carry ACK messages that acknowledge the reception of a reverse link physical layer packet sent from the M2M device 115-c using the reverse link communications 330. In one configuration, a greater number of ACK messages may be transmitted in an ACK packet when the conditions of the forward link frame appear to be favorable. This may include identifying a number of copies of a packet an M2M device must transmit on the reverse link communication 330 until it is successfully decoded by the base station. Similarly, a smaller number of ACK messages may be transmitted in an ACK packet when the conditions of the forward link do not appear to be as favorable. Increasing and decreasing the number of ACK messages in a packet effectively changes the data rate that is used to transmit an ACK message to an M2M device. As a result, rather than sending every ACK message at the lowest data rate, some ACK messages may be sent at a higher data rate. When ACKs (i.e., ACK messages) are transmitted at higher data rates to the M2M device 115-c, the device 115-c may receive and decode the ACK more quickly, thus increasing the forward link ACK throughput and terminating the reverse link communications 330 at an earlier time period than if the ACK was transmitted using a low data rate.

In one configuration, the operating band of the reverse link communications 330 may be divided into multiple reverse link frequency channels. Within each frequency channel, CDMA techniques may be used to multiplex the reverse link communications for multiple M2M devices 115. In one example, each reverse link frequency channel may have its own rise over thermal (RoT) operation point. At least one frequency channel may be dedicated as a low data rate random access channel, with a low RoT. Dividing the operating band of the reverse link communications 330 may provide a low RoT operation target (e.g., 1 decibel (dB) or less) for reverse link communications for M2M devices that do not have a strong signal strength with the base station. A low RoT may reduce the link budget requirement for those devices in locations with large path loss.

In one example, to increase the power efficiency of the M2M device 115-c, a narrowband frequency-division multiple access (FDMA) technique may be used for the reverse link communications 330. This technique may include dividing the operating band of the reverse link communications 330 into a number of narrowband frequency channels. The base station 105-c may broadcast the status and assignment of each narrowband channel to each M2M device 115. The status may be "busy" or "idle". In one embodiment, the M2M device 115-c may only transmit data if a narrowband frequency channel is assigned to the device 115-c. The early termination of the reverse link communications 330 (described above) may be incorporated into the narrowband FDMA technique to exploit the signal-to-interference noise ratio (SINR) distribution and to support multiple data rates in the reverse link communications 330. Early termination on the reverse link may occur when the status of a frequency channel transitions from a busy status to an idle status. Upon detecting that the status has transitioned to idle, the M2M device may terminate transmissions on the reverse link.

Figure 4A:
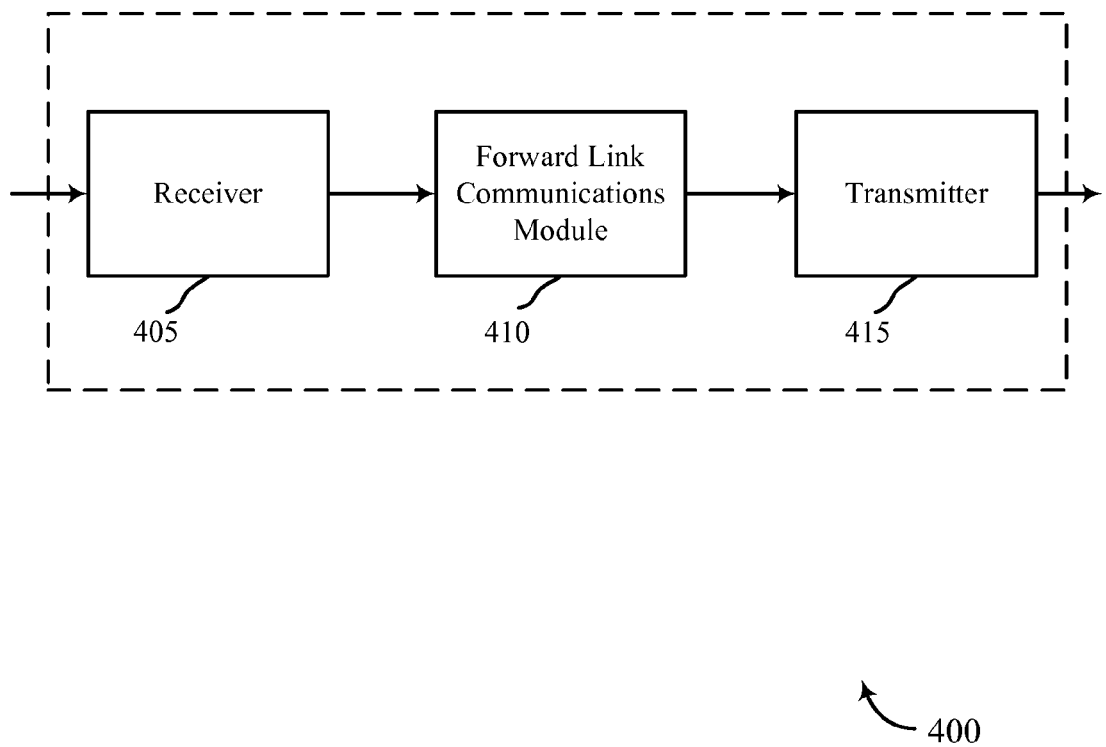
FIG. 4A is a block diagram illustrating a device for managing forward link communications in accordance with various embodiments.

Turning next to FIG. 4A, a block diagram illustrates a device 400 for managing forward link communications in accordance with various embodiments. The device 400 may be an example of one or more aspects of base stations 105 described with reference to FIGS. 1, 2, 3A, and/or 3B. The device 400 may also be a processor. The device 400 may include a receiver module 405, a forward link communications module 410, and/or a transmitter module 415. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as a packet, data, and/or signaling information regarding what the device 400 has received or transmitted. The received information may be utilized by the forward link communications module 410 for a variety of purposes.

The receiver module 405 may be configured to receive a reverse link physical layer packet sent from an M2M device 115 using reverse link communications 330. The receiver module 405 may also be configured to receive instructions, a set of operations, messages, etc. from a back-end server to communicate to an M2M device 115. The forward link communications module 410 may generate one or more forward link frames. The frames may be short duty cycle frames that include a minimal number of time slots used for logical channels. The forward link frames may be slotted for communications with multiple M2M devices. Details regarding the forward link frame will be described below.

The forward link communications module 410 may generate a slot map to broadcast to one or more M2M devices 115 using the transmitter 415. The map may be broadcasted to the M2M devices 115 that are expecting a transmission of traffic data on the forward link communications 325 during the current traffic channel cycle. The map may identify the traffic slots during which traffic data will be transmitted for each device 115. The transmitter module 415 may transmit the slot map in the first forward link frame of the traffic channel cycle to the one or more M2M devices 115.

In one embodiment, the forward link communications module 410 may generate a number of paging messages 305 to transmit to a number of M2M devices 115 via the transmitter module 415. The paging messages 305 may alert specific M2M devices 115 that a base station 105 is requesting the M2M device 115 to make contact with the base station 105. In one configuration, paging messages 305 may be transmitted in the paging channel (or a sub-channel of the paging channel) during the paging time slot at different data rates, depending on whether the M2M device 115 successfully demodulates a paging message.

In one configuration, the paging channel may include less than the maximum number of paging messages 305. If the paging channel does not include the maximum number of paging messages 305, the paging slot may be determined to idle. The unused capacity of the paging channel may be utilized by inserting system information into the paging channel. The system information may then be broadcast to the M2M devices 115 in the paging channel during the paging time slot of the forward link frame. Additional channels and time slots are avoided in forward link frames to transmit this type of information. Instead, idle paging time slots may be reused to transmit system information.

The receiver module 405 may receive a paging response 310 when the M2M device 115 successfully decodes the paging message 305. When the receiver module 405 does not receive the paging response 310, the forward link communications module 410 may be configured to instruct the transmitter module 415 to retransmit the paging message 305. The transmitter module 415 may retransmit the message 305 at a lower data rate and at a higher frequency than the original transmission of the paging message 305. The transmitter module 415 may cease the retransmission when a paging response 310 is received by the receiver module 405 and/or after a certain number of retransmissions of the message 305 have been transmitted. The transmitter module 415 may transmit and retransmit the paging messages 305 on different sub-paging channels of different forward link frames. In one configuration, when the paging channel is not needed to transmit a paging message 305, the forward link communications module 410 may generate and insert system information into the paging channel of the forward link frame. The transmitter module 415 may transmit the system information to an M2M device 115 in the paging channel of the frame. In one configuration, the transmitter 415 may transmit information using multiple paging channels of multiple frames. Paging messages may be transmitted in different paging channels at different data rates and at different paging cycles.

Figure 4B:
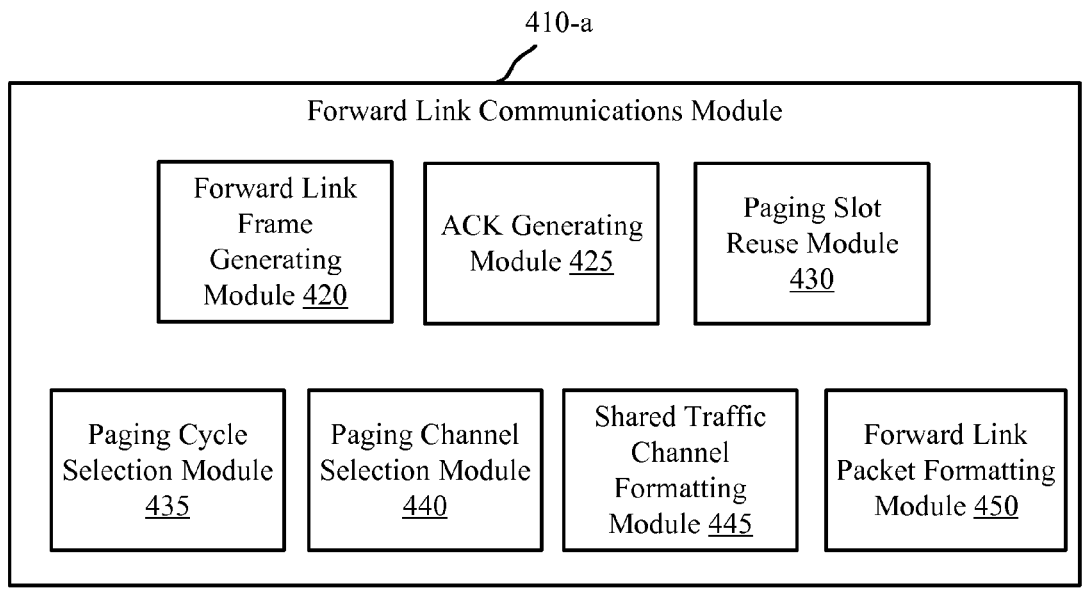
FIG. 4B is a block diagram illustrating one embodiment of a forward link communications module.

FIG. 4B is a block diagram illustrating one embodiment of a forward link communications module 410-a. The module 410-a may be an example of the forward link communications module of FIG. 4A. In one example, the module 410-a may include a forward link frame generating module 420, an ACK generating module 425, a paging slot reuse module 430, a paging cycle selection module 435, a paging channel selection module 440, a shared traffic channel formatting module 445, and a forward link packet formatting module 450.

The forward link frame generating module 420 may generate a physical layer frame to be used for communications on the forward link 325 (e.g., from a base station to an M2M device). The generated frame may be based on a short duty cycle and a small number of slotted physical layer channels. For example, the module 420 may generate a forward link physical layer frame that is a total of 20 milliseconds (ms). The slotted operation of the frame generated by the module 420 may allow the M2M device 115 to wake up and turn on its radio only during the scheduled time slot of the frame where it is expecting data. As a result, the M2M device 115 may be in the awake mode for less than the length of the frame.

Each of the physical channels of the forward link frame may include both pilot symbols and data symbols, which may be time division multiplexed (TDM). In one configuration, a forward link frame generated by the module 420 may include a paging slot, an ACK slot, and a traffic slot. Paging messages and other information may be transmitted in a paging channel to an M2M device 115 on the forward link communications 325 during the paging time slot. ACK messages and additional information may be transmitted in an ACK channel (e.g., a random access channel) during the ACK slot. Data traffic may be transmitted in a traffic channel to an M2M device 115 during the traffic slot.

The ACK generating module 425 may generate an ACK message to transmit on the forward link communications 325. The message may be transmitted in an ACK channel that is part of the forward link frame generated by the forward link frame generating module 420. In one configuration, the channel may be used to transmit multiple ACKs in an ACK packet. Each ACK in the packet may be an identifier (ID) of an M2M device 115. The ID may be a network ID of an M2M device. In addition, the ID may be a compressed version of the network ID. For example, a compressed ID may be a hash of the network ID of the M2M device 115. In one configuration, the ACK generating module 425 may group multiple ACKs to create the ACK packet. In one embodiment, ACK packets may include different quantities of ACKs depending on the channel conditions of the forward link.

In some instances, a paging slot may be idle for a certain forward link frame. For example, the capacity of the paging channel during the paging slot may not be at full capacity. For instance, the paging slot may not be scheduled to transmit a paging message 305 for an M2M device 115. As a result, the paging channel may be empty (e.g., no paging messages 305). The paging slot reuse module 430 may reuse the idle paging slot to communicate system information to the M2M device 115. The system information may include system timing and sector number information and may be inserted into the paging channel for transmission to the M2M devices 115 during the paging time slot. Thus, the establishment of additional channels within the forward link frame to convey the system information to an M2M device 115 may be avoided. Instead, the paging slot reuse module 430 may insert the system information in an idle paging channel of the paging slot in the frame.

In one embodiment, the paging cycle selection module 435 may select a particular paging cycle to transmit paging messages to an M2M device. The module 435 may provide a flexible paging scheme to dynamically change the paging cycle for an M2M device 115 in an M2M wireless WAN. The paging cycle selection module 435 may dynamically change the paging cycle depending on whether a paging response 310 is received from the device 115, the time of day, the state of operation of the M2M device 115, etc.

In one configuration, the paging channel selection module 440 may select between sub-channels of the paging channel to transmit a paging message to an M2M device 115 using the forward link communications 325. For example, the selection module 440 may select between a primary and secondary paging channel. The module 440 may provide a paging scheme that allows for paging messages to be transmitted at different data rates in an M2M WAN using primary and secondary paging channels. The primary paging channel may be used for longer paging cycles while the secondary paging channel may be used for shorter paging cycles. In one example, a base station 105 may transmit a first paging message. The module 440 may select the primary channel. The first paging message may be transmitted in the primary channel at a high data rate over a long paging cycle. The base station may also transmit a second paging message. The module 440 may select the secondary paging channel. The second paging message may be transmitted in the second paging message since the second message is to be transmitted at a lower data rate over a shorter paging cycle. In one embodiment, the first and second paging messages may be the same. In one example, the paging channels may be logical channels. In one configuration, the paging channels may be code division multiple access (CDMA) channels. In one example, the paging channels may be time division multiple access (TDMA) channels.

The shared traffic channel formatting module 445 may format a traffic channel in the forward link frame that may be shared by multiple M2M devices. When a M2M device 115 is expecting data on a shared traffic channel during a traffic slot within a given traffic channel cycle, the device 115 may continue reading the traffic channel slots across multiple forward link frames during a traffic channel cycle until it finds its data as indicated by the ID field. As a result, the M2M device 115 may stay awake longer than necessary to find its data. The formatting module 445 may format the traffic channel in such a way so as to minimize the wake up time for the M2M device 115. The M2M device 115 may determine which slot(s) of a particular frame(s) to wake up in order to retrieve its data on the shared traffic channel. To determine which slot to wake up for, the base station 105 may broadcast a slot map during the first traffic slot of the cycle. The map may use hashing functions to identify which traffic slot an M2M device 115 can expect to receive its data during the cycle. The traffic channel may be formatted by the module 445 to allow the device to determine which slot to use. For example, the module 445 may format the shared traffic channel so that the hashed slot either contains the data or a pointer to a slot where the actual data is located. If a slot of a first frame cannot contain all the pointers, the module 445 may set an overflow flag and provide a pointer to another slot of another frame where the hashed M2M device can check for its data. If all the data for the M2M device 115 cannot be accommodated during a single slot, then the module 445 may include a trailer field that includes a pointer to another slot where the remaining data is transmitted.

The forward link packet formatting module 450 may format a packet to be transmitted on the forward link communications 325. In one example, the module 450 may create multiple copies of the packet. In addition, the module 450 may insert a single copy of the packet into a sub-slot of a time slot in a forward link frame. In one embodiment, a time slot (e.g., paging slot, ACK slot, traffic slot) of a forward link frame may be divided in a number of sub-slots. The forward link packet formatting module 450 may insert a single copy of the packet into each of the generated sub-slots. In one configuration, the channel used to carry the packet during the time slot may also be divided into a number of sub-channels. As a result, a sub-channel may be used during each sub-slot to carry the copy of the packet on the forward link communications 325. Each sub-channel may be used to transmit the copies of the packet at a high data rate.

Figure 5A:
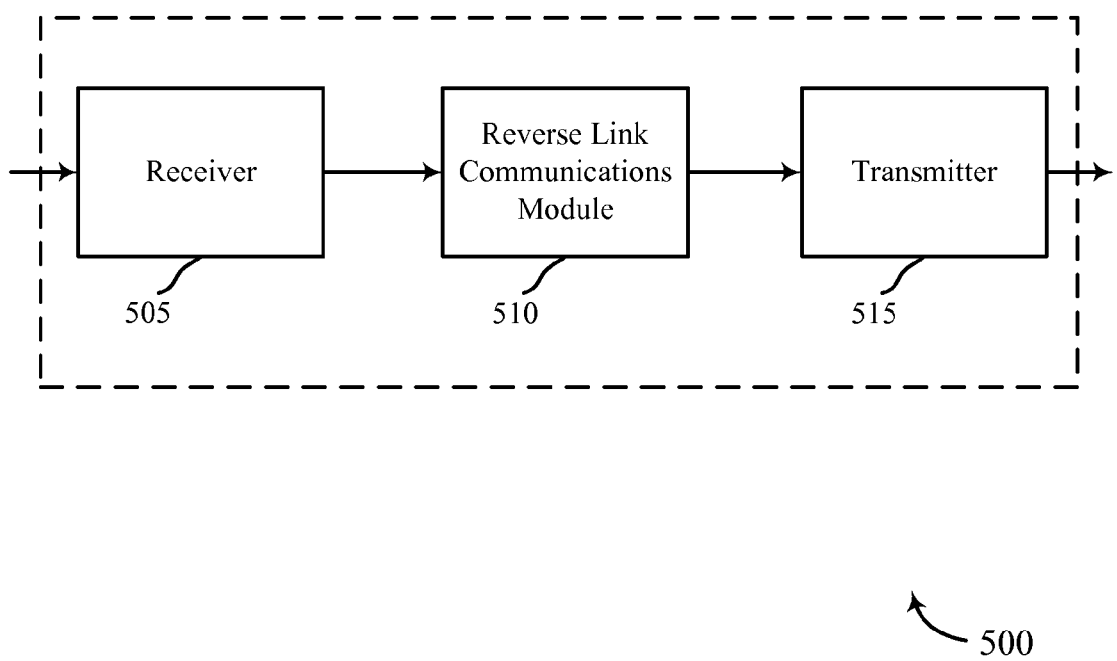
FIG. 5A is a block diagram illustrating a device for managing reverse link communications in accordance with various embodiments.

FIG. 5A is a block diagram illustrating a device 500 for managing reverse link communications in accordance with various embodiments. The device 500 may be an example of one or more aspects of the M2M device 115 and/or the base station 105 described with reference to FIGS. 1, 2, 3A, and/or 3B. The device 500 may also be a processor. The device 500 may include a receiver module 505, a reverse link communications module 510, and/or a transmitter module 515. Each of these components may be in communication with each other.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as a packet, data, and/or signaling information regarding what the device 500 has received or transmitted. The received information may be utilized by the reverse link communications module 510 for a variety of purposes.

The receiver module 505 may be configured to receive a forward link physical layer packet sent from a base station 105 using forward link communications 325. The reverse link communications module 510 may generate a reverse link frame that includes a traffic slot during which traffic may be transmitted from an M2M device 115 to a base station 105.

In one embodiment, the reverse link communications module 510 may cause communications on the reverse link to terminate early. As previously explained, the forward link frame may include an ACK channel to carry ACK messages from the base station 105 to an M2M device 115 at a high data rate. Upon receiving the ACK message, the reverse link communications module 510 may instruct the transmitter 515 to cease transmitting communications on the reverse link communications 330. Details regarding the reverse link communications module 510 will be described below.

Figure 5B:
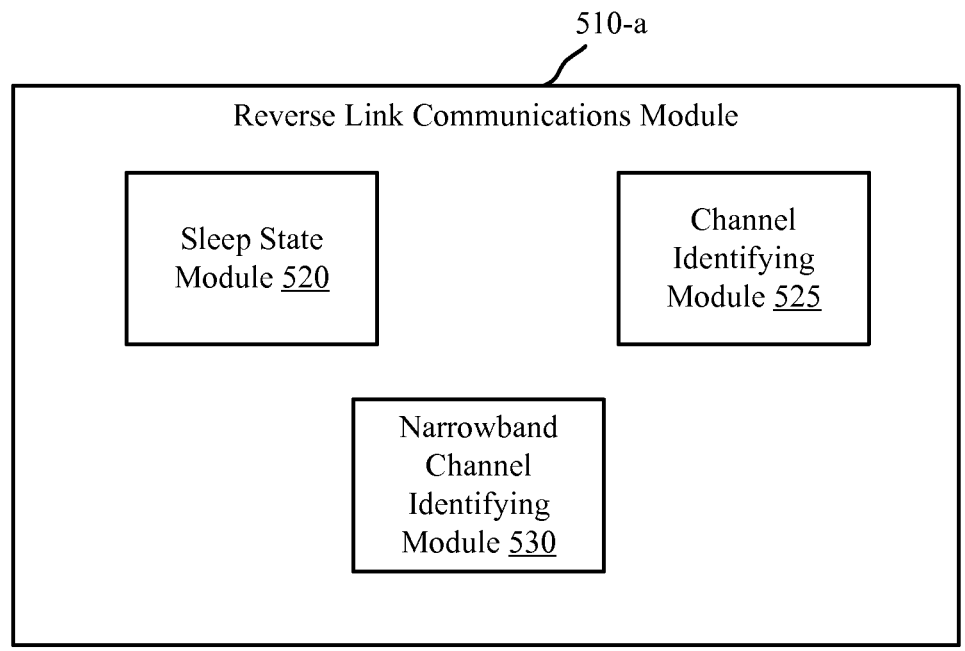
FIG. 5B is a block diagram illustrating one embodiment of a reverse link communications module.

FIG. 5B is a block diagram illustrating one embodiment of a reverse link communications module 510-a. The module 510-a may be an example of the reverse link communications module of FIG. 5A. In one example, the module 510-a may include a sleep state module 520, a channel identifying module 525, and a narrowband channel identifying module 530.

In one configuration, the sleep state module 520 may allow an M2M device 115 to wake up long enough to receive a message from a base station 105 and then return to a sleep state to conserve power. The base station may transmit a message to the M2M device using a forward link frame. The frame may include a paging channel to carry the message. The paging channel may include a number of sub-channels. The base station may transmit a copy of the message in each sub-channel. When the M2M device successfully receives and demodulates the message on one of the sub-channels, the sleep state module 520 may cause the M2M device 115 to turn off its radio and return to a sleep state to conserve the battery without sending an ACK message back to the base station.

In one embodiment, the channel identifying module 525 may identify a reverse link channel to use based at least in part on the RoT level of the channel. As previously explained, the operating band of the reverse link may be divided into multiple reverse link frequency channels. Within each frequency channel, CDMA may be implemented for multiple user multiplexing. Each frequency channel may have its own target RoT operation point. At least one frequency channel may be dedicated as a low data rate random access channel with a low RoT operation point.

In one example, the narrowband channel identifying module 530 may identify a narrowband channel to use to transmit data on the reverse link based at least in part on the status of the channel. In one embodiment, the operating band of the reverse link may be divided into a number of narrowband frequency channels. A busy or idle status of each narrowband channel may be broadcasted to each M2M device 115. The devices may contend for a channel selected randomly from the idle set of channels by sending a preamble. The module 530 may select a channel to use to transmit data on the reverse link if the channel is either implicitly or explicitly assigned to the M2M device. The transmission of the data on the selected channel may not be interrupted if the channel state transitions to a busy status.

Figure 6:
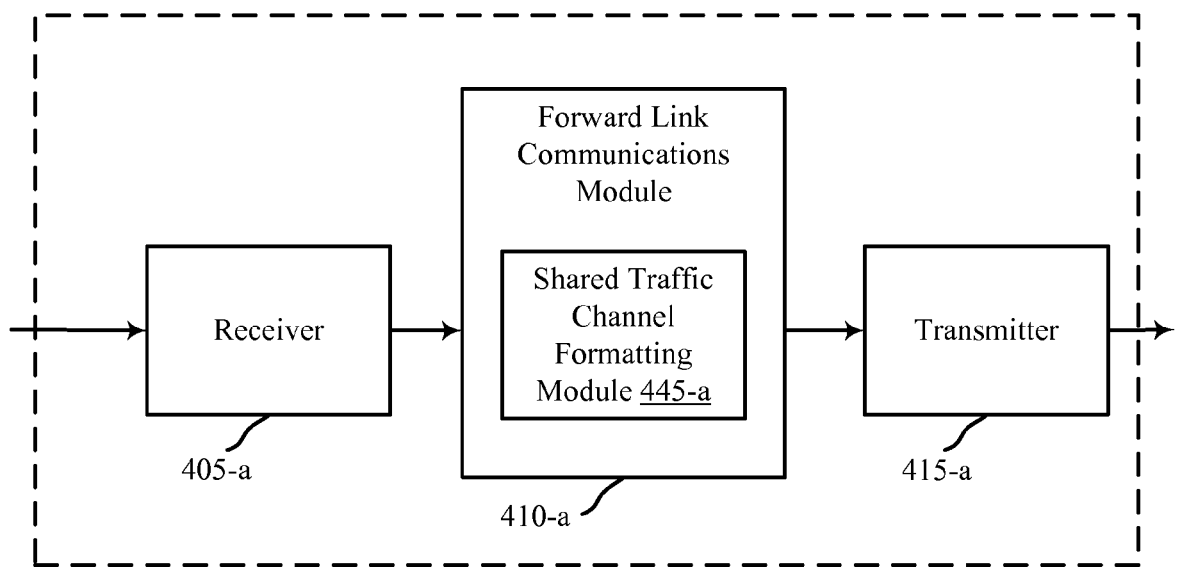
FIG. 6 is a block diagram illustrating a device for managing forward link communications in accordance with various embodiments.

FIG. 6 is a block diagram illustrating a device 600 for managing forward link communications in accordance with various embodiments. The device 600 may be an example of one or more aspects of the base station described with reference to FIGS. 1, 2, 3A, 3B, 4A, and/or 4B. The device 600 may also be a processor. The device 600 may include a receiver module 405-a, a forward link communications module 410-a, and/or a transmitter module 415-a. Each of these components may be in communication with each other.

The components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405-a may receive information such as packet, data, and/or signaling information regarding what the device 600 has received or transmitted. The received information may be utilized by the forward link communications module 410-a for a variety of purposes, as previously described.

In one configuration, the forward link communications module 410-a may include a shared traffic channel formatting module 445-a. The module 445-a may generate a slot map to be broadcasted to multiple M2M devices 115 at the beginning of a traffic channel cycle. The slot map may indicate when traffic data for each device 115 will be transmitted during the cycle. Details regarding the creation and transmission of slot maps will be described below.

Figure 7:
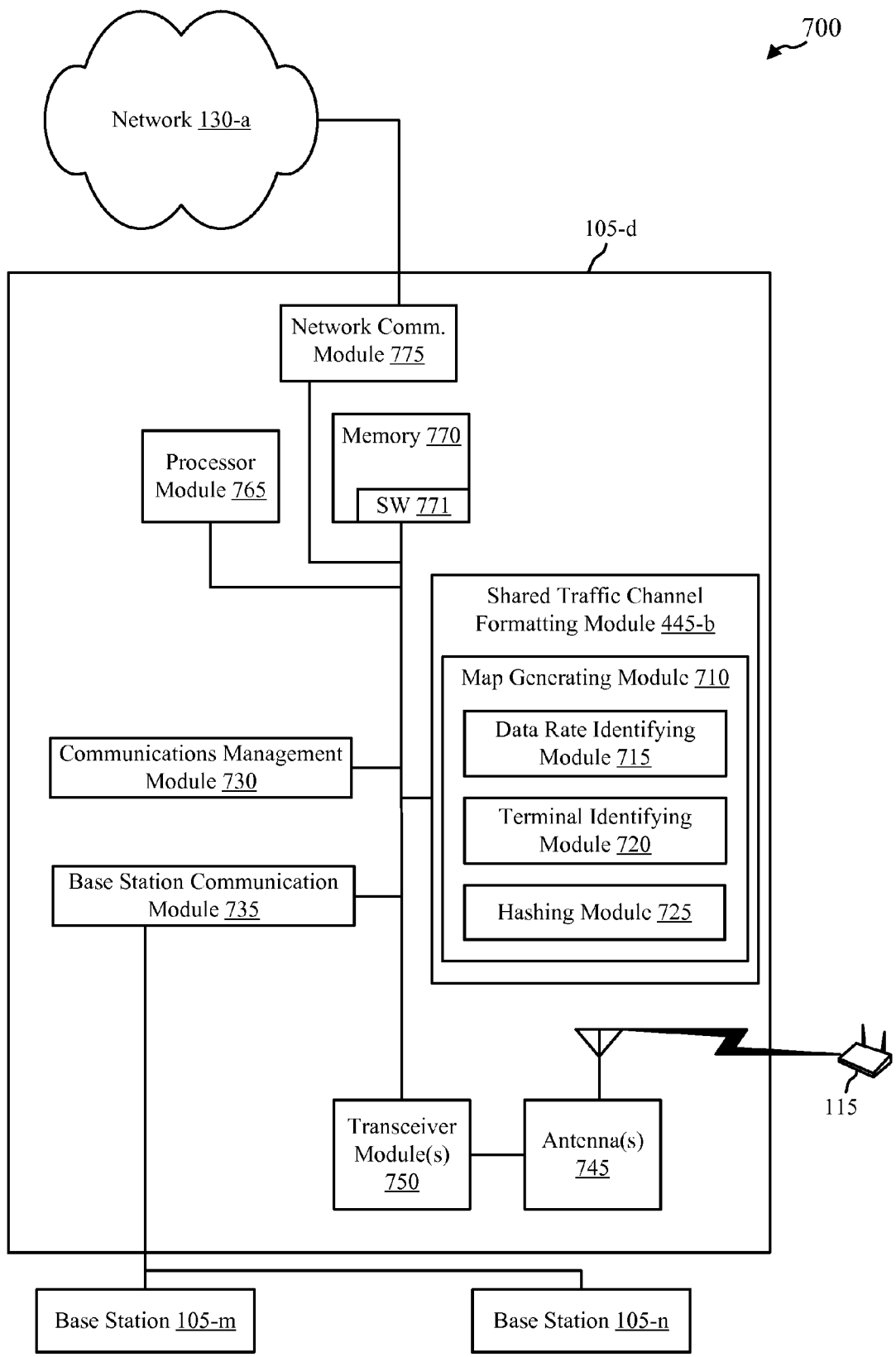
FIG. 7 shows a block diagram of a communications system that may be configured for creating and broadcasting a traffic slot map to M2M devices in accordance with various embodiments.

FIG. 7 shows a block diagram of a communications system 700 that may be configured for creating and broadcasting a traffic slot map to M2M devices 115 in accordance with various embodiments. This system 700 may be an example of aspects of the system 100 depicted in FIG. 1, system 200 of FIG. 2, system 300 of FIG. 3A, 320 of FIG. 3B, system 400 of FIG. 4A, and/or system 600 of FIG. 6.

The system 700 may include a base station 105-d. The base station 105-d may include antennas 745, a transceiver module 750, memory 770, and a processor module 765, which each may be in communication, directly or indirectly, with each other (e.g., over one or more buses). The transceiver module 750 may be configured to communicate bi-directionally, via the antennas 745, with an M2M device 115, which may be a sensor, meter, or any other type of device capable of tracking, sensing, monitoring, etc. The transceiver module 750 (and/or other components of the base station 105-d) may also be configured to communicate bi-directionally with one or more networks. In some cases, the base station 105-d may communicate with the core network 130-a through network communications module 775.

Base station 105-d may also communicate with other base stations 105, such as base station 105-m and base station 105-n. Each of the base stations 105 may communicate with the M2M device 115 using different wireless communications technologies, such as different Radio Access Technologies. In some cases, base station 105-d may communicate with other base stations such as 105-m and/or 105-n utilizing base station communication module 735. In some embodiments, base station 105-d may communicate with other base stations through the controller 120 and/or core network 130-a.

The memory 770 may include random access memory (RAM) and read-only memory (ROM). The memory 770 may also store computer-readable, computer-executable software code 771 containing instructions that are configured to, when executed, cause the processor module 765 to perform various functions described herein (e.g., slot map generation, ACK schemes, dynamic data rate schemes for paging messages, flexible paging schemes, data traffic schemes, etc.). Alternatively, the software 771 may not be directly executable by the processor module 765 but may be configured to cause the computer, e.g., when compiled and executed, to perform functions described herein.

The processor module 765 may include an intelligent hardware device, e.g., a central processing unit (CPU) such as those made by Intel® Corporation or AMD®, a microcontroller, an application-specific integrated circuit (ASIC), etc. The transceiver module 750 may include a modem configured to modulate packets for the M2M device 115 and provide the modulated packets to the antennas 745 for transmission, and to demodulate packets received from the antennas 745. While some examples of the base station 105-d may include a single antenna 745, the base station 105-d preferably includes multiple antennas 745 for multiple links which may support carrier aggregation. For example, one or more links may be used to support macro communications with the M2M device 115.

According to the architecture of FIG. 7, the base station 105-d may further include a communications management module 730. The communications management module 730 may manage communications with other base stations 105. By way of example, the communications management module 730 may be a component of the base station 105-d in communication with some or all of the other components of the base station 105-d via a bus. Alternatively, functionality of the communications management module 730 may be implemented as a component of the transceiver module 750, as a computer program product, and/or as one or more controller elements of the processor module 765.

The components for base station 105-d may be configured to implement aspects discussed above with respect to device 600 in FIG. 6 and may not be repeated here for the sake of brevity. In one embodiment, the base station 105-d may include a shared traffic channel formatting module 445-b, which may be an example of the module 445 illustrated in FIGS. 4B and/or 6. The module 445-b may include a map generating module 710. The map generating module 710 may generate a slot map to be broadcasted during a traffic slot of a forward link frame at the beginning of a traffic channel cycle. In one configuration, the map generating module 710 may include a data rate identifying module 715, a terminal identifying module 720, and a hashing module 725.

In one configuration, the data rate identifying module 715 may identify traffic slots during which data may be transmitted at certain data rates. In one embodiment, the module 715 may identify the number of traffic slots during which data will be transmitted at high and low data rates during the traffic channel cycle. The terminal identifying module 720 may identify a number of M2M devices 115 that are expecting their data at a high data rate and the number of M2M devices 115 that are expecting to receive their data at a low data rate during the traffic channel cycle. The number of traffic slots during which data will be transmitted at different data rates as well as the identified number of M2M devices 115 that are expecting their data at these different data rates may be included as part of the slot map generated by the map generating module 710. The hashing module 725 may use a hash function on the information included in the map. M2M devices 115 that receive the map may use a corresponding hash function to identify data in the map.

In some embodiments, the transceiver module 750 in conjunction with antennas 745, along with other possible components of base station 105-d, may transmit a number of forward link frames that each include a traffic slot, from the base station 105-d to the M2M device 115, to other base stations 105-m/105-n, or core network 130-a. The slot map may be transmitted during the traffic slot of the first forward link frame at the beginning of a traffic channel cycle.

Figure 8:
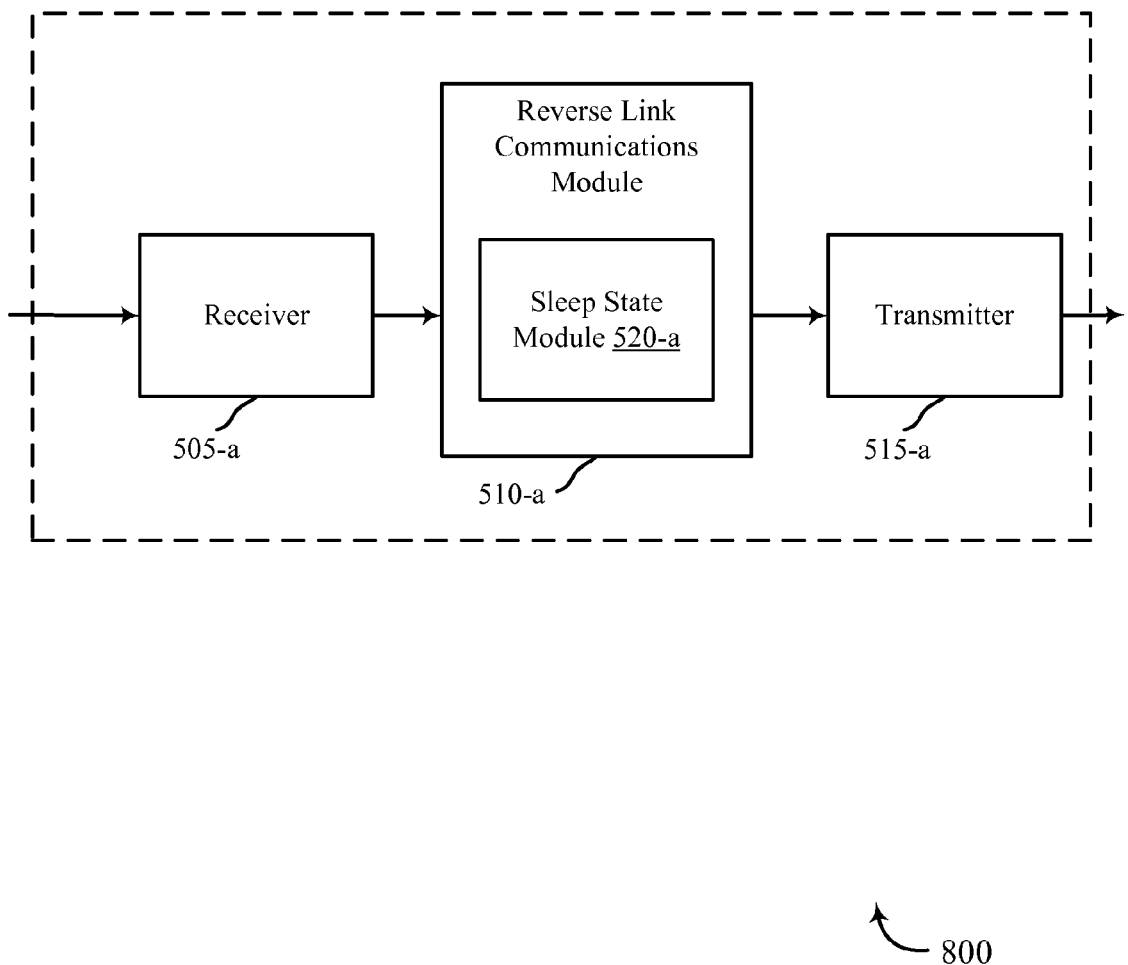
FIG. 8 is a block diagram illustrating a device for managing reverse link communications in accordance with various embodiments.

FIG. 8 is a block diagram illustrating a device 800 for managing reverse link communications in accordance with various embodiments. The device 800 may be an example of one or more aspects of the M2M device 115 described with reference to FIGS. 1, 2, 3A, 3B, and/or 5A. The device 800 may also be a processor. The device 800 may include a receiver module 505-a, a reverse link communications module 510-a, and/or a transmitter module 515-a. The reverse link communications module 510-a may include a sleep state module 520-a. The sleep state module 520-a may be an example of the module 520 described with reference to FIG. 5B. Each of these components may be in communication with each other.

These components of the device 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505-a may receive information such as packet, data, and/or signaling information regarding what the device 800 has received or transmitted. The received information may be utilized by the reverse link communications module 510-a for a variety of purposes. The transmitter module 515-a may transmit a packet, data, and/or signaling information on the reverse link in a reverse link frame. The reverse link frame may include a traffic slot and no other control slots during which control information may be transmitted. The traffic slot may have a length of 20 ms during which data may be transmitted on the reverse link.

The receiver module 505-a may be configured to receive a forward link physical layer packet sent from a base station 105 on the forward link. In one example, the receiver module 505-a may receive a traffic slot map that may be used by the device 800 to estimate when traffic data will be transmitted during a traffic cycle. The sleep state module 520-a may cause the M2M device 115 to return to a sleep state and turn off its radio after demodulating the received traffic slot map and determining when traffic data will be transmitted. For example, the sleep state module 520-a may cause the M2M device 115 to power down after successfully decoding and demodulating the map and identifying which frame and traffic slot data will be transmitted to the device 800 during the cycle.

Figure 9:
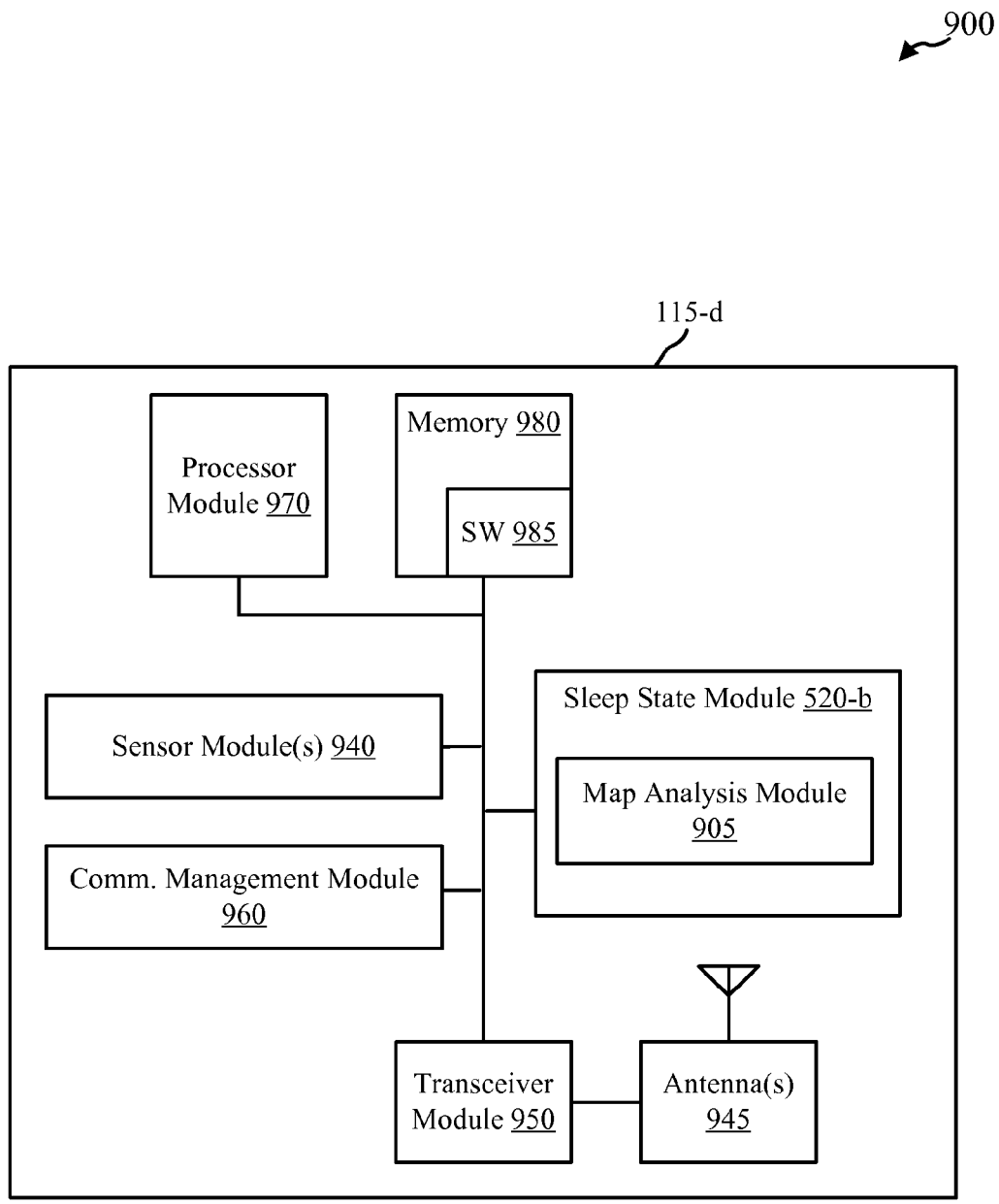
FIG. 9 shows a block diagram of a M2M device to manage consumption of power in accordance with various embodiments.

FIG. 9 shows a block diagram 900 of a M2M device 115-d to manage consumption of power in accordance with various embodiments. The M2M device 115-d may have any of various configurations, such as a sensor or monitor for various M2M applications discussed above. The M2M device 115-d may capture or sense information via sensor module(s) 940. The M2M device 115-d may have an internal power supply, such as a small battery, to facilitate mobile operation. In some embodiments, the M2M device 115-d may be the M2M device 115 described with reference to FIGS. 1, 2, 3A, and/or 3B. The M2M device 115-d may include aspects of device 500 of FIG. 5A and/or device 800 of FIG. 8. The M2M device 115-d may be a multi-mode mobile device. The M2M device 115-d may be referred to as an M2M UE or MTC device in some cases.

The M2M device 115-d may include antenna(s) 945, a transceiver module 950, memory 980, and a processor module 970, which each may be in communication, directly or indirectly, with each other (e.g., via one or more buses). The transceiver module 950 may communicate bi-directionally, via the antenna(s) 945 and/or one or more wired or wireless links, with one or more networks, as described above. For example, the transceiver module 950 may communicate bi-directionally with base stations 105 of FIGS. 1, 2, 3A, 3B and/or 7. Further, the transceiver module 950 may communication with aspects of device 400 of FIG. 4A and/or device 600 of FIG. 6. The transceiver module 950 may include a modem configured to modulate the packets and provide the modulated packets to the antenna(s) 945 for transmission, and to demodulate packets received from the antenna(s) 945. While the M2M device 115-d may include a single antenna 945, the M2M device 115-d may include multiple antennas 945 for multiple transmission links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., receive packets, enter a sleep state, etc.). Alternatively, the software code 985 may not be directly executable by the processor module 970 but be configured to cause the computer (e.g., when compiled and executed) to perform functions described herein. The processor module 970 may include an intelligent hardware device, e.g., a central processing unit (CPU) such as those made by Intel® Corporation or AMD®, an ASIC, a microcontroller, etc.

According to the architecture of FIG. 9, the M2M device 115-d may further include a communications management module 960. The communications management module 960 may manage communications with base stations 105 and/or other M2M devices 115. By way of example, the communications management module 960 may be a component of the M2M device 115-d in communication with some or all of the other components of the M2M device 115-d via a bus. Alternatively, functionality of the communications management module 960 may be implemented as a component of the transceiver module 950, as a computer program product, and/or as one or more controller elements of the processor module 970.

In some embodiments, M2M device 115-d may measure and/or capture data and transmit the data to a network without performing explicit registration on the network. In one embodiment, M2M device 115-d may monitor pilot signals of available base stations or network cells and select a base station or network cell for communication without explicitly registering with the base station or network cell. In some configurations, while not explicitly registered on the selected base station or network cell, M2M device 115-*d* may monitor system information for the selected base station or network cell. The system information for the selected base station or network cell may include explicit registration triggers and the M2M device 115-*d* may suppress explicit registration on a network even when one of the explicit registration triggers is detected. For example, the M2M device 115-*d* may suppress registrations based on one or more registration triggers such as device power up/power down, frequency/band class changes, time period-based registration, movement-based registration, zone-based registration, and/or parameter change based registration.

The system information may include access parameters for use in accessing the selected base station or network cell. The M2M device 115-*d* may capture or measure information related to an event (e.g., via sensor module(s) 940) and transmit that information to the selected base station or network cell as part of a network access prior to, or without performing, explicit registration on the selected base station or network cell. The network access may be performed using one or more of the access parameters. The M2M device 115-*d* may be implicitly registered by the selected base station or network cell as part of the network access transmitting the captured or measured event data to the selected base station or network cell.

Suppressing registration may also allow M2M device 115-*d* to select the best network cell for transmissions without regard to the power penalty incurred in registering with a target cell. For example, M2M device 115-*d* may select between available networks based on the estimated power consumption for communication with the respective networks without accounting for the power penalty that would be incurred by performing an explicit handover (with an explicit registration on the new network).

The components for M2M device 115-*d* may be configured to implement aspects discussed above with respect to device 500 of FIG. 5A and/or device 800 of FIG. 8 and may not be repeated here for the sake of brevity. In one example, the M2M device 115-*d* may include a sleep state module 520-*b*, which may be an example of the sleep state module of FIG. 5A and/or FIG. 8. The sleep state module 520-*a* may include a map analysis module 905. The module 905 may analyze a slot map received during a traffic slot of a forward link frame at the beginning of a traffic channel cycle. The analysis module 905 may determine (from the information in the map) when (which slot and frame) traffic data will be transmitted to the M2M device 115-*d*. Based on the analysis, the device 115-*d* may return to a sleep state until the identified slot and then wake up to receive the traffic data. In one embodiment, the analysis module 905 may estimate when traffic data will be transmitted by analyzing the map to determine the number of slots of the cycle during which data will be transmitted from the base station 105 at a first data rate, a second data rate, etc. In addition, the module 905 may analyze the map to determine the number of M2M devices expecting to receive their traffic data at the first data rate, the second data rate, etc. Using this information provided in the slot map, the map analysis module 905 may estimate when traffic data intended for the M2M device 115-*d* will be transmitted. In one configuration, traffic data for another M2M device may also be transmitted during the slot identified by the analysis module 905. As a result, when transmissions begin during the estimated slot, the M2M device 115-*d* may use a hashing function on the data being transmitted in the estimated slot to identify the portion of the data that is intended for the M2M device 115-*d*.

Figure 10A:
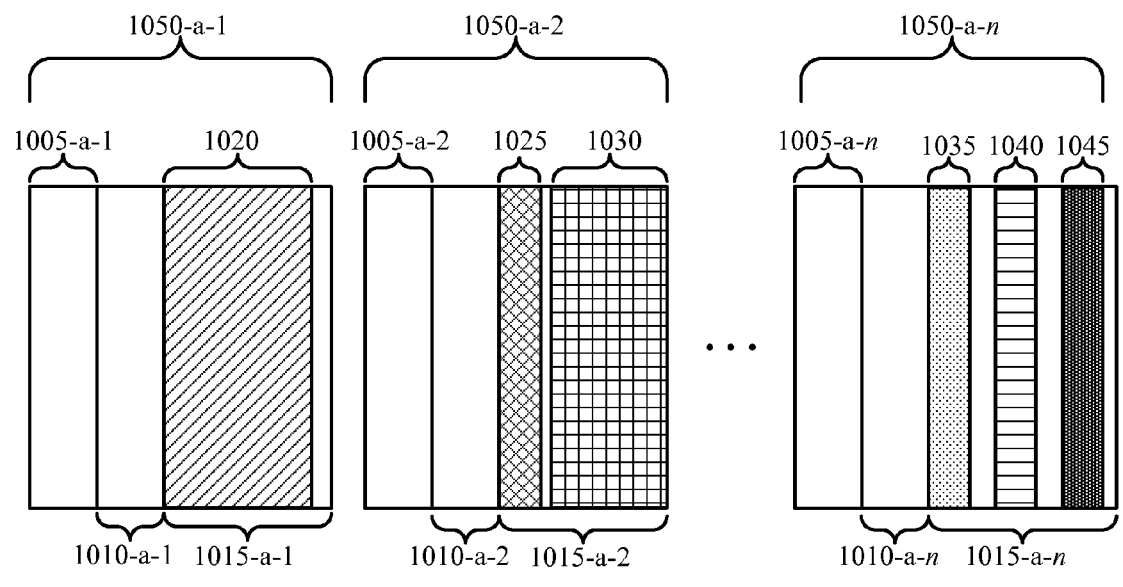
FIG. 10A is a block diagram illustrating one embodiment of a traffic channel cycle in accordance with various system and methods.

FIG. 10A is a block diagram illustrating one embodiment of a traffic channel cycle 1000 in accordance with various system and methods. During the cycle, multiple forward link frames 1050 may be transmitted from a base station 105 to one or more M2M devices 115 on the forward link 325. Each forward link frame 1050 may include one or more time slots. In one example, each frame 1050 may include a paging slot 1005, an ACK slot 1010, and a traffic slot 1015. During the paging slots 1005, paging messages may be transmitted to one or more M2M devices 115. During the ACK slots 1010, the base station 105 may transmit an ACK message indicating the base station 105 had successfully decoded and demodulated data transmitted on the reverse link.

In one configuration, traffic data may be transmitted during the traffic slots 1015 of the frames. During a first traffic slot 1015-*a*-1 of a first forward link frame 1050-*a*-1 of the cycle, a traffic slot map 1020 may be broadcasted at a physical layer. In one configuration, the slot map 1020 may be broadcasted at the lowest possible data rate on a traffic channel. Each M2M device 115 expecting to receive data during the current cycle may wake up to monitor the first traffic slot 1015-*a*-1. Each M2M device 115-*d* may be aware that a base station 105 will be transmitting traffic data during the traffic channel cycle by having previously received a paging message from the base station.

Upon receiving the broadcasted map 1020, each M2M device 115 may estimate when (which frame of the cycle) their data will be transmitted from the base station 105. This may allow each M2M device 115 to return to a sleep state to conserve power instead of remaining in an awake mode to monitor each traffic slot of each frame until their data is transmitted. In one example, during the cycle, traffic data 1025, 1030, 1035, 1040, and 1045 may be transmitted and intended for five different M2M devices 115. At the beginning of the cycle, each of the five devices 115 may wake up to monitor the first traffic slot 1015-*a*-1 to receive the traffic slot map 1020. Using the map 1020, a first M2M device may estimate that its data 1025 will be transmitted during at least a portion of a second traffic slot 1015-*a*-2 of a second forward link frame 1050-*a*-2. A second M2M device may also use the map 1020 to estimate that its data 1030 will also be transmitted during the second traffic slot 1015-*a*-2 of the second forward link frame 1050-*a*-2. A third, fourth, and fifth M2M device may estimate that their respective data 1035, 1040, and 1045 will be transmitted during an nth traffic slot 1015-*a*-*n* of an nth forward link frame 1050-*a*-*n* of the cycle. Upon estimating when data will be transmitted using the map 1020, each M2M device 115 may return to a sleep mode.

In one embodiment, the first and second M2M devices may wake up when the second frame 1050-*a*-2 is being transmitted. These devices may turn on their radios to monitor a shared traffic channel during the second traffic slot 1015-*a*-2. In one configuration, a hashing function may be used by the devices to determine which slot to wake up for and monitor (e.g., the second traffic slot 1015-*a*-2). Upon waking up, each device may decode and demodulate the data packet transmitted in the slot. Each device may use a certain ID to recognize their particular data within the decoded and demodulated data packet.

In one example, the third, fourth, and fifth M2M devices may remain in a sleep state until the nth frame 1050-*a*-*n* is transmitted. When this frame 1050-*a*-*n* is transmitted, the M2M devices may enter an awake mode to monitor the traffic slot 1015-*a*-*n* of the frame. As illustrated, a data packet that includes data 1035, 1040, and 1045 for each of these devices may be transmitted during the nth traffic slot. Each device may apply a hashing function to determine to wake up during the traffic slot 1015-*a-n*. In addition, each device may decode and demodulate the data packet and use a specific ID to identify the particular data 1035, 1040, and 1045 of the packet that is intended for them.

As an example, a traffic cycle may be two seconds long. A portion of the cycle may be allocated for forward link communications and the remaining portion may be allocated for reverse link communications. In this example, one second may be allocated for forward link communications and one second may be allocated for reverse link communications. Thus, one second for forward link communications may result in 50 forward link frames 1050 being transmitted, each 20 ms in duration. The traffic slot 1015 for each frame may have a length of 10 ms. With traditional communication systems, when an M2M device is expecting data, the device is required to wake up to monitor each traffic slot 1015 of each frame 1050 until it receives its data. If the data for the M2M device is transmitted during the last traffic slot (e.g., the 50th slot) of the cycle, the M2M device is unnecessarily awake to monitor 49 traffic slots 1015 of the first 49 frames 1050. The present methods and systems are described to minimize the wake-up time of an M2M device during the traffic channel cycle. By broadcasting the slot map 1020 at the beginning of a traffic cycle, M2M devices do not need to remain in an awake mode to monitor each traffic slot of each frame transmitted during the cycle until they identify their data. This allows each M2M device to conserve its power and resources by minimizing the amount of time the devices are in an awake mode during the cycle.

In one embodiment, the data for different M2M devices transmitted during different traffic slots may be transmitted at different data rates. For example, data transmitted during the second traffic slot 1015-*a*-2 (e.g., data 1025 and 1030) may be transmitted at a first data rate while the data transmitted during the nth traffic slot 1015-*a-n* (e.g., data 1035, 1040, and 1045) may be transmitted at a second data rate. In one configuration, different data transmitted during the same traffic slot may be transmitted at the same data rate or the different data may be transmitted at different data rates during the same traffic slot. In one embodiment, an M2M device 115-*d* may be aware of the data rate that it can receive its data. In one embodiment, the traffic slot map 1020 may indicate a number of traffic slots of the current cycle during which data will be transmitted at a first data rate, a second data rate, a third data rate, etc. Using this information, each M2M device may estimate which slot its data will be transmitted based on the number of slots during which data will be transmitted at its expected data rate.

In one embodiment, the M2M devices expecting to receive their data during a cycle may not be the same M2M devices expecting to receive data during the next cycle. As a result, a different group of M2M devices may wake up to monitor the first traffic slot 1015-*a*-1 for the traffic map 1020 at the beginning of each cycle. By avoiding pre-arranged groupings of M2M devices, communication resources and other overhead may be reduced. Thus, the group the M2M devices expecting to receive their data may be an ad hoc group for any given traffic channel cycle. In one configuration, the map 1020 may dynamically change during each subsequent traffic channel cycle. As a result, an M2M device may use the map 1020 to estimate when to wake up during a first cycle, but the device may use the map 1020 broadcasted at the beginning of a second cycle to estimate a different time to wake up during the cycle.

Figure 10B:
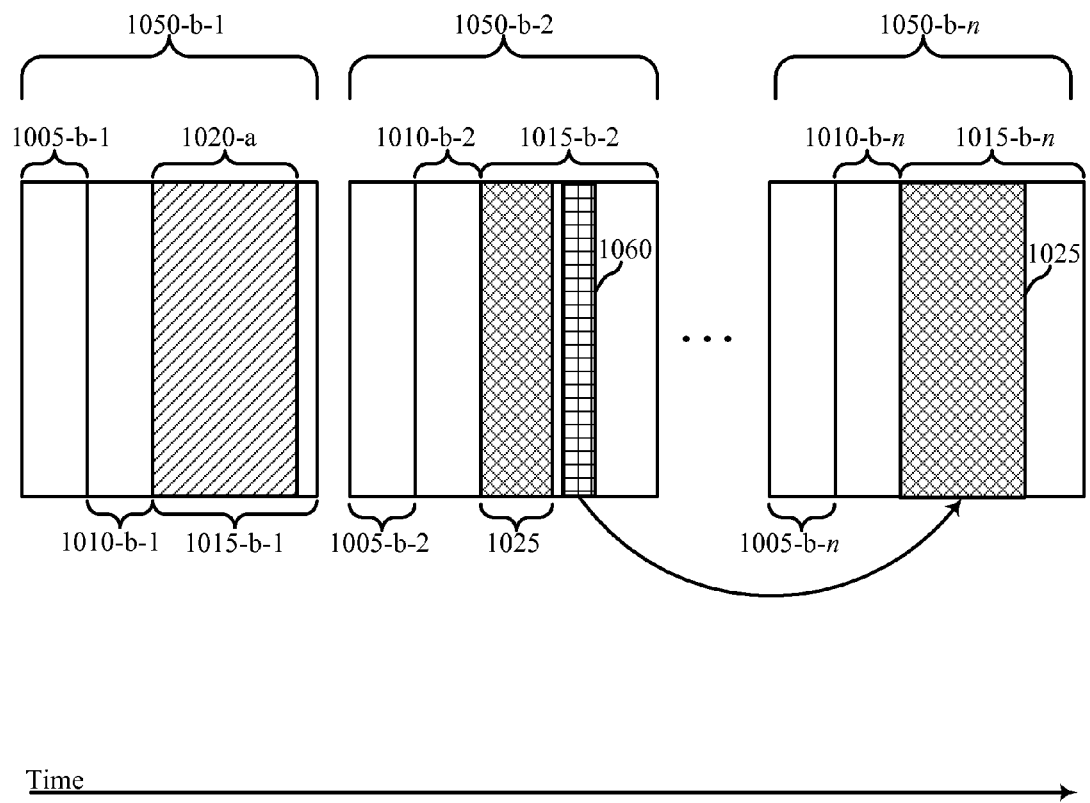
FIG. 10B is a block diagram illustrating another embodiment of the traffic channel cycle in accordance with various systems and methods.

FIG. 10B is a block diagram illustrating another embodiment of a traffic channel cycle 1055 in accordance with various system and methods. During the cycle 1055 a plurality of forward link frames 1050-*b* may be transmitted on the forward link. The frames 1050-*b* may be examples of the frames 1050-*a* illustrated in FIG. 10A. Each frame may include one or more slots, during which messages, data packets, signaling information, etc. may be transmitted to M2M devices. As previously explained, each frame 1050-*b* may include a paging slot 1005-*b*, an ACK slot 1010-*b*, and a traffic slot 1015-*b*. A traffic slot map 1020-*a* may be transmitted during the first traffic slot 1015-*b*-1 of the first forward link frame 1050-*b*-1. The map 1020-*a* may allow M2M devices to estimate when their respective data will be transmitted during the cycle.

In one configuration, traffic data 1025 intended for a first M2M device may be transmitted during a second frame 1050-*b*-2 of the cycle. The data 1025, however, may be too large to be transmitted during a single traffic slot 1015-*b*-2. A pointer 1060 may be inserted to be transmitted during the slot 1015-*b*-2. The pointer 1060 may point to another slot 1015-*b*-*n* of another frame 1050-*b*-*n* during which a remaining portion of the traffic data 1025 will be transmitted.

In one embodiment, the pointer 1060 may be inserted into a traffic slot 1015-*b*-2 with no data that is intended for the M2M device. As a result, the M2M device may turn on its radio to receive the broadcasted map 1020-*a* during the first traffic slot 1015-*b*-1 of the cycle. The device may estimate, from the map 1020-*a*, that its data will be transmitted during the second slot 1015-*b*-2 of the cycle. The device may turn off its radio until the second slot. During the second slot, the radio may be turned back on to monitor the slot. Instead of receiving data during the second slot 1015-*b*-2, the pointer 1060 may point the M2M device to a later traffic slot in the cycle. The device may then again turn off its radio until this later slot, at which time the radio may be turned back on, and the device may either receive a data packet, another pointer, or a combination of a portion of the data and another pointer indicating a future slot when another portion of the data will be transmitted. The pointer 1060 may be transmitted on a shared traffic channel that is shared among multiple M2M devices.

FIG. 11 is a block diagram illustrating one example of a slot map 1020-*b* in accordance with various embodiments. The slot map 1020-*b* may be an example of the map 1020 of FIG. 10A and/or FIG. 10B. In one configuration, the map 1020-*b* may include various types of information. The map 1020-*b* may include information indicating a number of slots during which data will be transmitted at a first data rate 1105. The slot map 1020-*b* may also indicate a number of slots during which data will be transmitted at a second data rate 1110. While the illustrated map 1020-*b* indicates the number of slots of a traffic cycle during data will be transmitted at first and second data rates, it is to be understood that the map 1020-*b* may indicate the number of slots of the cycle during which data will be transmitted at additional data rates. Further, the map 1020-*b* may include information that indicates a number of terminals (i.e., M2M devices) that will receive their data at the first data rate 1115 as well as a number of terminals that will receive their data at the second data rate 1120. The slot map 1020-*b* may further include one or more hashing parameters 1125. The hashing parameters 1125 may be used by a hashing function to hash the information in the slot map 1020-*b* for each M2M device 115 receiving the map 1020-*b*.

As previously explained, the slot map 1020-*b* may be transmitted during a traffic slot of a first forward link frame at the beginning of a traffic channel cycle. The map 1020-*b* may be broadcasted to each M2M device 115 that is expecting to receive traffic data during the cycle. Each device 115 may be aware of the data rate at which it is able to receive traffic data. By receiving the map at the beginning of cycle, M2M devices may become aware of the number of traffic slots in the current cycle that will be transmitting data at their desired data rate as well as the number of M2M devices that are expecting to receive their data at that data rate. This information may assist each M2M device to estimate when their data will be transmitted during the cycle. As a result, the M2M devices may only wake-up during the estimated time of the cycle to retrieve their data.

In one configuration, using a two second traffic channel cycle as an example, a first M2M device may be expecting data at a data rate of 20 kbps. The first M2M device may wake up during the first traffic slot of the cycle to receive the traffic slot map 1020-*b*. The map may reveal the number of traffic slots in this cycle during which data will be transmitted at 10 kbps. The map may also reveal the number of traffic slots during which data will be transmitted at 20 kbps. In addition, the map may indicate that 15 M2M devices are expecting their data at 20 kbps. After receiving the map, the first M2M device may return to the sleep mode during the traffic slots in which data is being transmitted in a traffic channel at 10 kbps. The device may wake up during the traffic slot in which data is being transmitted at 20 kbps, and which is mapped by the hashing function operating on the device ID, number of slots, and number of users at that data rate. In one example, the traffic channel may be shared between some or all of the other M2M devices expecting to receive their data at 20 kbps. The first M2M device may use a hash function on its ID, the number of slots, and number of users at that data rate to identify the slot it needs to wake up for and use its ID to locate its data within the slot. After receiving its data, the first device may return to a sleep state.

Thus, the use of the traffic slot map 1020-*b* may eliminate the need for an M2M device to remain in an awake mode during each traffic slot to monitor a traffic channel for its data. Instead, the M2M device may only wake-up when data is being transmitted on a traffic channel at the data rate expected by the M2M device.

Figure 12:
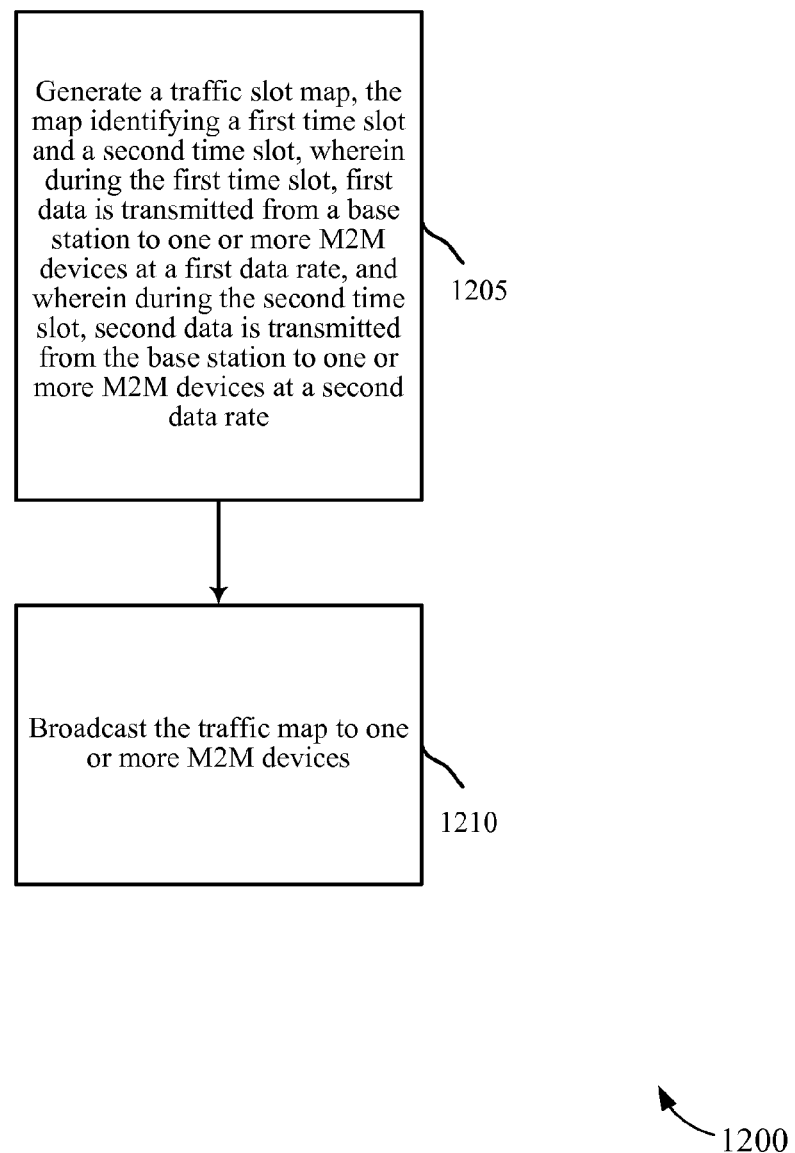
FIG. 12 is a flow chart illustrating one example of a method for conserving power of M2M devices by managing forward link communications using a traffic slot map that identifies when traffic data will be transmitted to each M2M device.

FIG. 12 is a flow chart illustrating one example of a method 1200 for conserving power of M2M devices by managing forward link communications using a traffic slot map that assists M2M devices to estimate when their respective traffic data will be transmitted on the forward link. For clarity, the method 1200 is described below with reference to the base station 105 shown in FIG. 1, 2, 3A, 3B, 4A, 6, or 7. In one implementation, the shared traffic channel formatting module 445 may execute one or more sets of codes to control the functional elements of the base station 105 to perform the functions described below.

At block 1205, a traffic slot map may be generated. The map may identify one or more first time slots and one or more second time slots. In one configuration, during the one or more first time slots, first data may be transmitted from a base station to one or more M2M devices at a first data rate. During the one or more second time slots, second data may be transmitted from the base station to one or more M2M devices at a second data rate. The second data rate may be different than the first data rate.

At block 1210, the traffic slot map may be broadcasted to one or more M2M devices. The one or more M2M devices may be an ad hoc group of devices that may change for each subsequent traffic channel cycle. The map may be broadcasted at the beginning of a current traffic channel cycle. In one example, the plurality of M2M devices 115 may be the devices expecting to receive traffic data during the current traffic channel cycle. The plurality of M2M devices 115 may use the map to determine when their respective data will be transmitted during the cycle. The devices 115 may return to a sleep state until the estimate time during the cycle in which their data is transmitted.

Therefore, the method 1200 may provide for efficient management of a power supply of M2M devices by managing communications on the forward link. It should be noted that the method 1200 is just one implementation and that the operations of the method 1200 may be rearranged or otherwise modified such that other implementations are possible.

Figure 13:
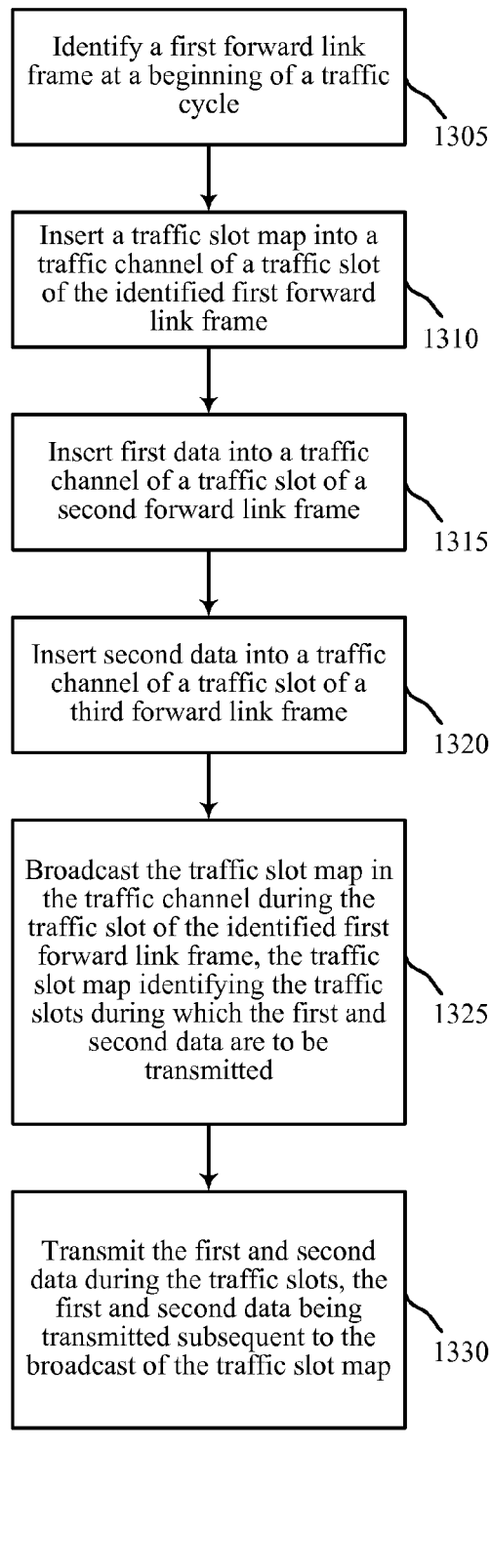
FIG. 13 is a flow chart illustrating one example of a method for conserving the power of M2M devices by broadcasting a traffic slot map at the beginning of a traffic channel cycle.

FIG. 13 is a flow chart illustrating one example of a method 1300 for conserving the power of M2M devices by broadcasting a traffic slot map at the beginning of a traffic channel cycle. For clarity, the method 1300 is described below with reference to the base station 105 shown in FIG. 1, 2, 3A, 3B, 4A, 6, or 7. In one implementation, the shared traffic channel formatting module 445 may execute one or more sets of codes to control the functional elements of the base station 105 to perform the functions described below.

At block 1305, a first forward link frame may be identified. The first forward link frame may be the first frame transmitted on the forward link during a traffic channel cycle. At block 1310, a traffic slot map may be inserted into a traffic channel. The traffic channel may be used to carry data during a traffic slot of the identified first forward link frame. The traffic channel may be shared by each M2M device expecting to receive data during the traffic channel cycle.

At block 1315, first data may be inserted into a traffic channel of a traffic slot of a second forward link frame and at block 1320, second data may be inserted into a traffic channel of a traffic slot of a third forward link frame. The first data may be intended for a first M2M device while the second data may be intended for a second M2M device. Alternatively, the first and second data may be inserted into the same traffic channel used to carry data during the same traffic slot.

At block 1325, the traffic slot map may be broadcasted in the traffic channel during the traffic slot of the identified first forward link frame. In one embodiment, the map may identify frames and traffic slots during which the first and second data will be transmitted during the cycle. At block 1330, the first and second data may be transmitted during the traffic slots identified by the slop map. The first and second data may be transmitted subsequent to the broadcast of the traffic slot map. The first and second data may be transmitted at the same data rate or at different data rates. In addition, the first and second data may be transmitted during the same traffic slot of the same forward link frame, or during different slots of different frames. Thus, M2M devices may become aware of when their data will be transmitted during the cycle by receiving the broadcasted map at the beginning of the cycle.

Therefore, the method 1300 may provide for saving power and other resources of M2M devices by generating a traffic slot map that indicates when data will be transmitted at different data rates. It should be noted that the method 1300 is just one implementation and that the operations of the method 1300 may be rearranged or otherwise modified such that other implementations are possible.

Figure 14:
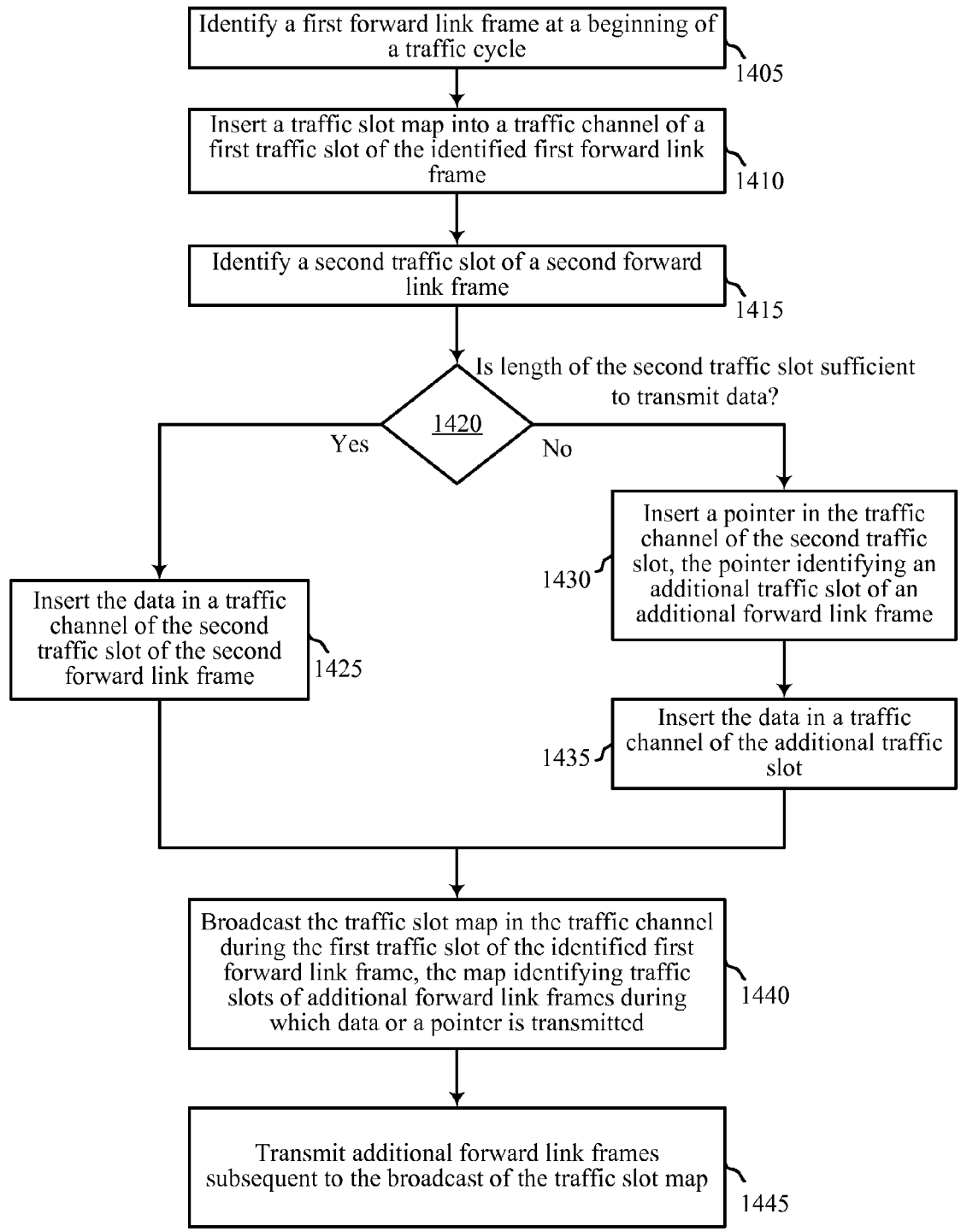
FIG. 14 is a flow chart illustrating one example of a method for transmitting pointers to indicate when a data packet will be transmitted during a traffic channel cycle.

FIG. 14 is a flow chart illustrating one example of a method 1400 for broadcasting information to M2M devices at the beginning of a traffic cycle to assist the devices determine when their data will be transmitted during the cycle. For clarity, the method 1400 is described below with reference to the base station 105 shown in FIG. 1, 2, 3A, 3B, 4A, 6, or 7. In one implementation, the shared traffic channel formatting module 445 may execute one or more sets of codes to control the functional elements of the base station 105 to perform the functions described below.

At block 1405, a first forward link frame may be identified that is transmitted at the commencement of a traffic channel cycle. At block 1410, a traffic slot map may be inserted into a traffic channel to be transmitted during a traffic slot of the frame. At block 1415, a traffic slot of a second forward link frame may be identified. The second forward link frame may be transmitted during the cycle after the transmission of the first forward link frame has occurred.

At block 1420, a determination may be made as to whether the length of the traffic slot of the second frame is sufficient to transmit a data packet. For example, the length of the traffic slot may be 10 ms. If the size of the data packet is sufficiently small to allow transmission of the complete packet during the 10 ms slot, at block 1425, the complete data packet may be inserted into a traffic channel to be transmitted during the traffic slot. If, however, the data packet is too large to be completely transmitted during the traffic slot, a pointer may be inserted in the traffic channel to be transmitted during the slot at block 1430. The pointer may identify an additional traffic slot of an additional forward link frame transmitted after the transmission of the second forward link frame. In one example, a portion of the data packet may still be inserted into the traffic channel, along with the pointer. In another example, the pointer may be inserted in the traffic channel with no insertion of any portion of the data packet.

At block 1435, all or a portion of the data packet may be inserted into a traffic channel to be transmitted during the additional slot of the additional frame. In one example, if the length of the additional slot is not sufficient to allow transmission of the portion of the data packet, an additional pointer may be inserted into the traffic channel to point to another slot during which another portion of the data packet will be transmitted during the cycle. As a result, during a traffic slot of a forward link frame, a complete data packet, a portion of a data packet, a pointer, or any combination thereof may be transmitted on the forward link.

At block 1440, the traffic slot map may be broadcasted in the traffic channel during the traffic slot of the identified first frame. As previously explained, the map may identify traffic slots of the additional frames during which data or a pointer will be transmitted. At block 1445, the additional forward link frames may be transmitted. The transmission of the additional frames may occur after the broadcast of the map has been completed.

Therefore, the method 1400 may provide for efficient transmission of data packets by first broadcasting information to indicate when the packets will be transmitted. It should be noted that the method 1400 is just one implementation and that the operations of the method 1400 may be rearranged or otherwise modified such that other implementations are possible.

Figure 15:
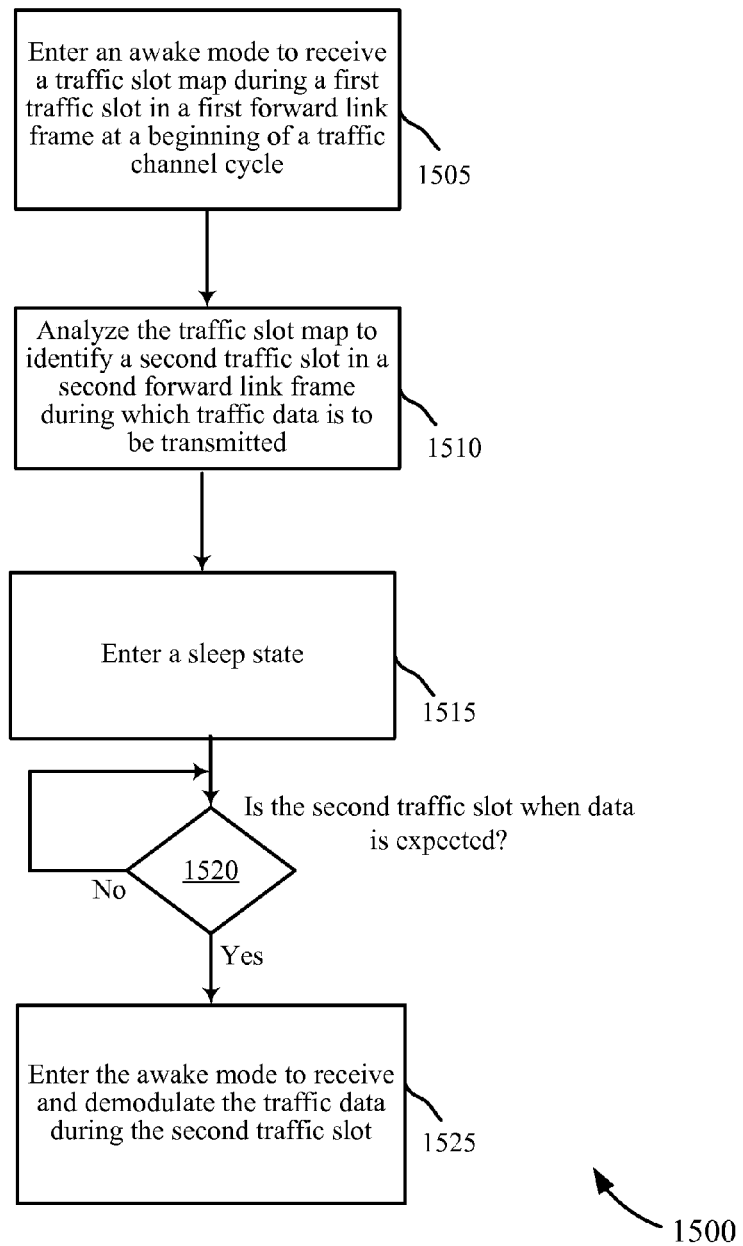
FIG. 15 is a flow chart illustrating one example of a method for managing a power supply of an M2M device by remaining in a sleep state until traffic data is transmitted during a traffic channel cycle.

FIG. 15 is a flow chart illustrating one example of a method 1500 for managing a power supply of an M2M device by remaining in a sleep state until traffic data is transmitted during a traffic channel cycle. For clarity, the method 1500 is described below with reference to an M2M device 115 shown in FIGS. 1, 2, 3A, 3B, 5A, 8, and/or 9. In one implementation, the map analysis module 905 may execute one or more sets of codes to control the functional elements of the M2M device 115 to perform the functions described below.

At block 1505, the M2M device 115 may enter an awake mode to receive a traffic slot map. The map may be received during a first traffic slot in a first forward link frame. The frame may be transmitted at the beginning of a traffic channel cycle. In one example, the forward link frame may be the first frame transmitted during the cycle.

At block 1510, the traffic slot map may be analyzed to identify a second traffic slot in a second forward link frame during which traffic data is to be transmitted that is intended for the M2M device. The second forward link frame may be transmitted subsequent to the transmission of the first forward link frame. As block 1515, the M2M device 115 may enter a sleep state. At block 1520, a determination may be made as to whether the second traffic slot in the second forward link frame is where the data is expected. If the second traffic slot is not the expected slot for its data, the M2M device 115 may remain in the sleep state. If, however, it is determined that the second traffic slot is the expected slot, at block 1525, the M2M device 115 may enter the awake mode to receive and demodulate the traffic data during the second traffic slot.

Therefore, the method 1500 may provide for efficient management of power of the M2M device 115 by allowing the device to remain in the sleep state during a traffic cycle until the data packet intended for the device is transmitted. It should be noted that the method 1500 is just one implementation and that the operations of the method 1500 may be rearranged or otherwise modified such that other implementations are possible.

Techniques described herein may be used for various wireless communications systems such as M2M systems, cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/ or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication in a machine-to-machine (M2M) wireless Wide Area Network (WAN), comprising:
   generating a traffic slot map, the traffic slot map indicating a first number of slots of a traffic channel cycle that will be transmitted at a first data rate, a second number of slots of the traffic channel cycle that will be transmitted at a second data rate, and one or more hashing parameters, the traffic slot map to be used by one or more M2M devices to allow each of the one or more M2M devices to identify at least one time slot within the traffic channel cycle having data intended for the identifying M2M device; and
   broadcasting the traffic slot map to the one or more M2M devices.

2. The method of claim 1, wherein broadcasting the traffic slot map comprises:
   inserting the traffic slot map into a traffic channel of a traffic slot of a first forward link frame, the first forward link frame at a beginning of the traffic channel cycle; and
   broadcasting the traffic slot map during the traffic slot of the first forward link frame.

3. The method of claim 2, further comprising:
   transmitting during a first time slot and during a second time slot, wherein during the first time slot, first data is transmitted from a base station to one or more M2M devices at the first data rate, and wherein during the second time slot, second data is transmitted from the base station to one or more M2M devices at the second data rate.

4. The method of claim 3, wherein broadcasting the traffic slot map comprises:
   broadcasting the traffic slot map before any transmission of the first data and the second data occurs.

5. The method of claim 3, wherein the traffic slot of the first forward link frame comprises the first or second time slot.

6. The method of claim 3, further comprising:
   transmitting a second forward link frame subsequent to a transmission of the first forward link frame, the second forward link frame comprising a traffic slot, the traffic slot comprising the first or second time slot.

7. The method of claim 2, wherein the traffic channel cycle comprises a first time allocation for forward link communications and a second time allocation for reverse link communications.

8. The method of claim 3, wherein transmitting the first data comprises:
   transmitting a pointer during the first time slot of the first forward link frame, the pointer identifying an additional time slot of an additional forward link frame; and
   transmitting at least a portion of the first data during the additional time slot, the portion of the first data being transmitted at the first data rate.

9. The method of claim 1, wherein the traffic slot map identifies a first number of M2M devices expecting to receive traffic data at the first data rate and a second number of M2M devices expecting to receive traffic data at the second data rate, the traffic data being transmitted at a physical layer.

10. The method of claim 3, further comprising:
    using a first hashing function to identify the first time slot for a first M2M device; and
    using a second hashing function to identify the second time slot for a second M2M device.

11. The method of claim 1, wherein the first data rate is different than the second data rate.

12. The method of claim 3, wherein the first and second time slots comprise one or more traffic slots in one or more forward link frames.

13. A base station configured for wireless communication in a machine-to-machine (M2M) wireless Wide Area Network (WAN), comprising:
   a processor;
   memory in electronic communication with the processor; and
   instructions stored in the memory, the instructions being executable by the processor to:
     generate a traffic slot map, the traffic slot map indicating a first number of slots of a traffic channel cycle that will be transmitted at a first data rate, a second number of slots of the traffic channel cycle that will be transmitted at a second data rate, and one or more hashing parameters, the traffic slot map to be used by one or more M2M devices to allow each of the one or more M2M devices to identify at least one time slot within the traffic channel cycle having data intended for the identifying M2M device; and
     broadcast the traffic slot map to the one or more M2M devices.

14. The base station of claim 13, wherein the instructions to broadcast the traffic slot map are further executable by the processor to:
   broadcast the traffic slot map during a traffic slot of a first forward link frame at a beginning of the traffic channel cycle.

15. The base station of claim 13, wherein the traffic channel cycle comprises a first time allocation for forward link communications and a second time allocation for reverse link communications.

16. The base station of claim 13, wherein the traffic slot map identifies a first number of M2M devices expecting to receive at the first data rate and a second number of M2M devices expecting to receive at the second data rate.

17. The base station of claim 13, wherein the instructions are further executable by the processor to:
   use a first hashing function to identify a first time slot for a first M2M device; and
   use a second hashing function to identify a second time slot for a second M2M device.

18. The base station of claim 13, wherein the first data rate is different than the second data rate.

19. The base station of claim 13, wherein a first and second time slots comprise one or more traffic slots in one or more forward link frames.

20. An apparatus configured for wireless communication in a machine-to-machine (M2M) wireless Wide Area Network (WAN), comprising:
   means for generating a traffic slot map, the traffic slot map indicating a first number of slots of a traffic channel cycle that will be transmitted at a first data rate, a second number of slots of the traffic channel cycle that will be transmitted at a second data rate, and one or more hashing parameters, the traffic slot map to be used by one or more M2M devices to allow each of the one or more M2M devices to identify at least one time slot within the traffic channel cycle having data intended for the identifying M2M device; and
   means for broadcasting the traffic slot map to the one or more M2M devices.

21. The apparatus of claim 20, wherein the means for broadcasting the traffic slot map comprise:
   means for broadcasting the traffic slot map during a traffic slot of a first forward link frame at a beginning of the traffic channel cycle.

22. The apparatus of claim 20, wherein the traffic channel cycle comprises a first time allocation for forward link communications and a second time allocation for reverse link communications.

23. The apparatus of claim 20, wherein the traffic slot map identifies a first number of M2M devices expecting to receive at the first data rate and a second number of M2M devices expecting to receive at the second data rate.

24. The apparatus of claim 20, further comprising:
   means for using a first hashing function to identify a first time slot for a first M2M device; and
   means for using a second hashing function to identify a second time slot for a second M2M device.

25. The apparatus of claim 20, wherein the first data rate is different than the second data rate.

26. The apparatus of claim 20, wherein a first and second time slots comprise one or more traffic slots in one or more forward link frames.

27. A computer program product for managing wireless communication in a machine-to-machine (M2M) wireless Wide Area Network (WAN), the computer program product comprising a non-transitory computer-readable medium storing instructions executable by a processor to:
   generate a traffic slot map, the traffic slot map indicating a first number of slots of a traffic channel cycle that will be transmitted at a first data rate, a second number of slots of the traffic channel cycle that will be transmitted at a second data rate, and one or more hashing parameters, the traffic slot map to be used by one or more M2M devices to allow each of the one or more M2M devices to identify at least one time slot within the traffic channel cycle having data intended for the identifying M2M device; and
   broadcast the traffic slot map to the one or more M2M devices.

28. The computer program product of claim 27, wherein the instructions to broadcast the traffic slot map are further executable by the processor to:
   broadcast the traffic slot map during a traffic slot of a first forward link frame at a beginning of the traffic channel cycle.

29. The computer program product of claim 27, wherein the traffic channel cycle comprises a first time allocation for forward link communications and a second time allocation for reverse link communications.

30. The computer program product of claim 27, wherein the traffic slot map identifies a first number of M2M devices expecting to receive at the first data rate and a second number of M2M devices expecting to receive at the second data rate.

31. The computer program product of claim 27, wherein the instructions are further executable by the processor to:
   use a first hashing function to identify a first time slot for a first M2M device; and
   use a second hashing function to identify a second time slot for a second M2M device.

32. The computer program product of claim 27, wherein the first data rate is different than the second data rate.

33. The computer program product of claim 27, wherein the first and second time slots comprise one or more traffic slots in one or more forward link frames.

34. A method for wireless communication in a machine-to-machine (M2M) wireless Wide Area Network (WAN), comprising:

receiving, at an M2M device, a traffic slot map during a first traffic slot in a first forward link frame at a beginning of a traffic channel cycle, the traffic slot map indicating a first number of slots of the traffic channel cycle that will be transmitted at a first data rate, a second number of slots of the traffic channel cycle that will be transmitted at a second data rate, and one or more hashing parameters;

using the traffic slot map to identify at least one time slot within the traffic channel cycle having data intended for the M2M device;

entering a sleep state until the at least one time slot; and entering an awake mode to receive the data during the at least one time slot.

35. The method of claim 34, wherein analyzing the traffic slot map comprises:

determining a first number of M2M devices expecting to receive traffic data at the first data rate; and determining a second number of M2M devices expecting to receive traffic data at the second data rate, the second data rate being different from the first data rate.

36. The method of claim 34, wherein using the traffic slot map comprises:

using a hashing function to determine the at least one time slot, wherein the hashing function is based on the one or more hashing parameter.

37. The method of claim 34, wherein receiving the data during the at least one time slot comprises:

using a device identifier to identify the data transmitted during the at least one time slot.

* * * * *